United States Patent
Miyamoto et al.

(10) Patent No.: US 11,762,243 B2
(45) Date of Patent: Sep. 19, 2023

(54) DISPLAY DEVICE

(71) Applicant: Japan Display Inc., Tokyo (JP)

(72) Inventors: Motoharu Miyamoto, Tokyo (JP); Tomokazu Ishikawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/866,786

(22) Filed: Jul. 18, 2022

(65) Prior Publication Data

US 2022/0350182 A1    Nov. 3, 2022

Related U.S. Application Data

(63) Continuation of application No. 17/142,839, filed on Jan. 6, 2021, now Pat. No. 11,391,995, which is a continuation of application No. PCT/JP2019/025729, filed on Jun. 27, 2019.

(30) Foreign Application Priority Data

Jul. 9, 2018   (JP) .................................. 2018-130222

(51) Int. Cl.
  *G02F 1/1339*   (2006.01)
  *G02F 1/1362*   (2006.01)
  *G09G 3/36*     (2006.01)

(52) U.S. Cl.
  CPC ...... *G02F 1/1339* (2013.01); *G02F 1/136286* (2013.01); *G09G 3/3674* (2013.01)

(58) Field of Classification Search
  CPC ................................................. G02F 1/1362
  See application file for complete search history.

(56) References Cited

U.S. PATENT DOCUMENTS

| | | | |
|---|---|---|---|
| 2005/0275038 A1* | 12/2005 | Shih ................ | H01L 29/78648 |
| | | | 257/382 |
| 2010/0002178 A1* | 1/2010 | Ninomiya ......... | G02F 1/136259 |
| | | | 349/138 |
| 2016/0211308 A1 | 7/2016 | Lee | |
| 2016/0334680 A1* | 11/2016 | Miyamoto ........... | G02F 1/1339 |
| 2017/0153482 A1 | 6/2017 | Miyamoto | |

(Continued)

FOREIGN PATENT DOCUMENTS

| JP | 2007-293371 A | 11/2007 |
|---|---|---|
| JP | 2012-194423 A | 10/2012 |

(Continued)

OTHER PUBLICATIONS

International Search Report issued in connection with PCT/JP2019/025729, dated Aug. 6, 2019.

*Primary Examiner* — Sang V Nguyen
(74) *Attorney, Agent, or Firm* — K&L Gates LLP

(57) ABSTRACT

Display device is provided and includes scanning line; semiconductor layer; pixel electrode; first insulating film having first contact hole; organic insulating film having second contact hole; and second insulating film having third contact hole, wherein semiconductor layer has first linear portion that is orthogonal to scanning line, pixel electrode is electrically connected to first linear portion via first, second and third contact holes, first linear portion overlaps first, second and third contact holes that are aligned along first linear portion, and center of second contact hole is located between center of first contact hole and center of third contact hole.

8 Claims, 17 Drawing Sheets

(56) References Cited

U.S. PATENT DOCUMENTS

| | | | |
|---|---|---|---|
| 2017/0222059 A1 | 8/2017 | Chen et al. | |
| 2017/0235167 A1 | 8/2017 | Ishikawa et al. | |
| 2017/0329444 A1 | 11/2017 | Hwang et al. | |
| 2018/0045993 A1* | 2/2018 | Miyamoto | G02F 1/13439 |
| 2019/0196281 A1* | 6/2019 | Oikawa | H01L 27/124 |

FOREIGN PATENT DOCUMENTS

| | | |
|---|---|---|
| JP | 2016-080809 A | 5/2016 |
| JP | 2017-097281 A | 6/2017 |
| JP | 2017-146449 A | 8/2017 |

\* cited by examiner

FIG.13
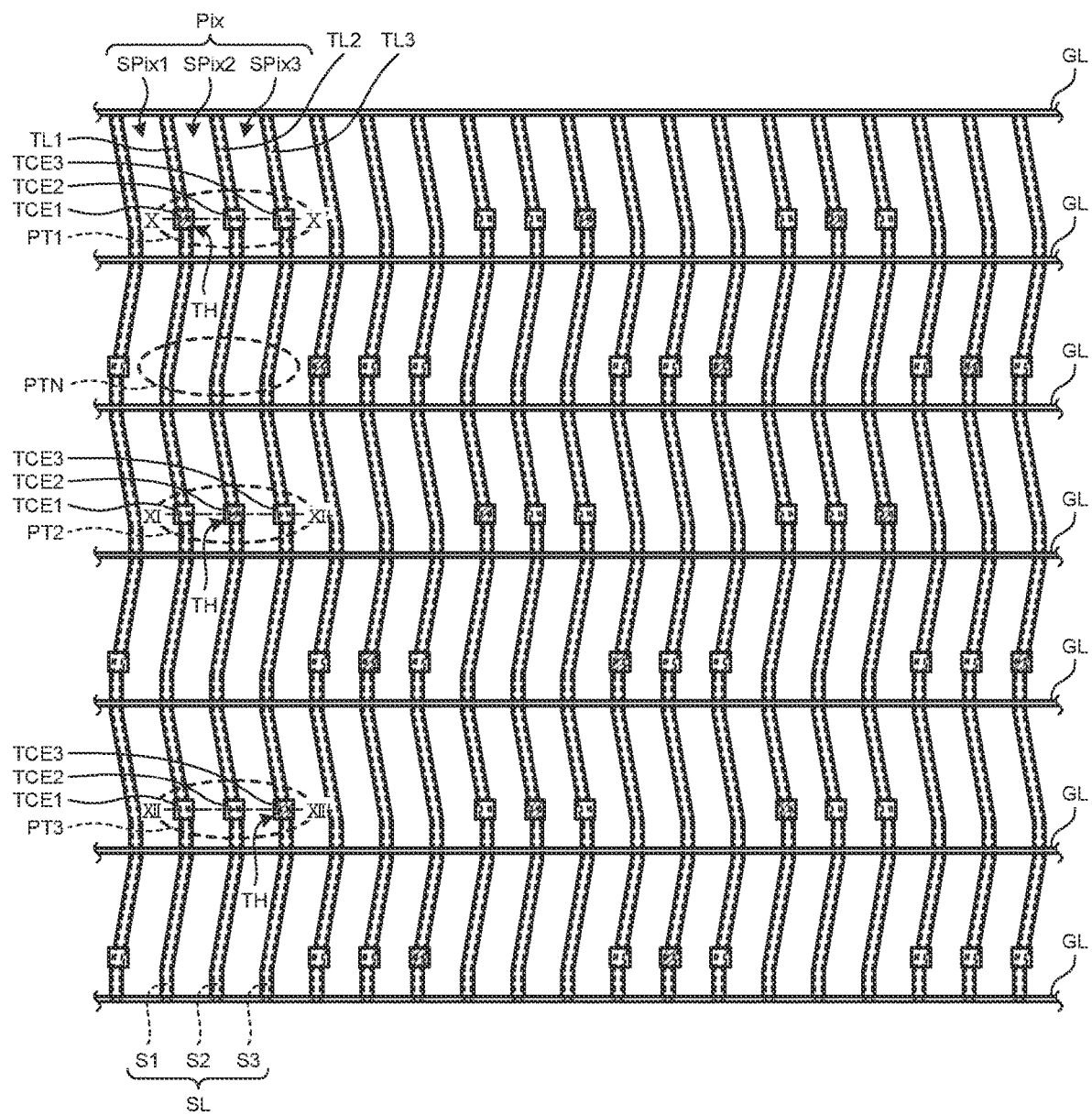
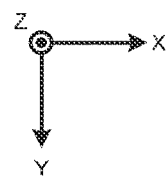

DISPLAY DEVICE

CROSS-REFERENCE TO RELATED APPLICATION

This application is a continuation of U.S. patent application Ser. No. 17/142,839, filed on Jan. 6, 2021, which application is a continuation of PCT International Patent Application No. PCT/2019/025729 filed on Jun. 27, 2019 which designates the United States, incorporated herein by reference, and which claims the benefit of priority from Japanese Patent Application No. 2018-130222 filed on Jul. 9, 2018, incorporated herein by reference.

BACKGROUND

1. Technical Field

The present disclosure relates to a display device.

2. Description of the Related Art

Japanese Patent Application Laid-open Publication No. 2017-146449 (JP-A-2017-146449) describes a display device that suppresses display unevenness caused by an orientation film around a contact hole.

In the technique of (JP-A-2017-146449), although display unevenness caused by the orientation film around the contact hole is suppressed to some extent, it is desired to further suppress the occurrence of display unevenness.

The present disclosure aims to provide a display device that suppresses display unevenness caused by an orientation film around a contact hole.

A display device according to one aspect comprising: an array substrate; a counter substrate provided with color filters; and a liquid crystal layer between the array substrate and the counter substrate; wherein one surface of the array substrate includes a plurality of signal lines arranged side by side in a first direction with a gap interposed therebetween, a plurality of scanning lines arranged side by side in a second direction with a gap interposed therebetween, a first organic insulating film provided on the signal lines, and a second organic insulating film provided on the first organic insulating film; each region surrounded by the corresponding scanning line and the corresponding signal line includes a semiconductor layer, a first contact conductive layer, a second contact conductive layer, and a first electrode; the signal line is electrically coupled to a first part of the semiconductor layer, and the first contact conductive layer is electrically coupled to a second part of the semiconductor layer; the second contact conductive layer comes into contact with the first contact conductive layer via a first contact hole formed in the first organic insulating film; at least a part of a contact region of the second contact conductive layer in which the second contact conductive layer is in contact with the first contact conductive layer is covered with the second organic insulating film; the first electrode and the second contact conductive layer are electrically coupled to each other via a second contact hole formed in the second organic insulating film; and the first contact hole and the second contact hole deviate from each other in the second direction.

BRIEF DESCRIPTION OF THE DRAWINGS

FIG. 13 is a plan view for explaining widened parts of metal wires;

DETAILED DESCRIPTION

Figure 1:
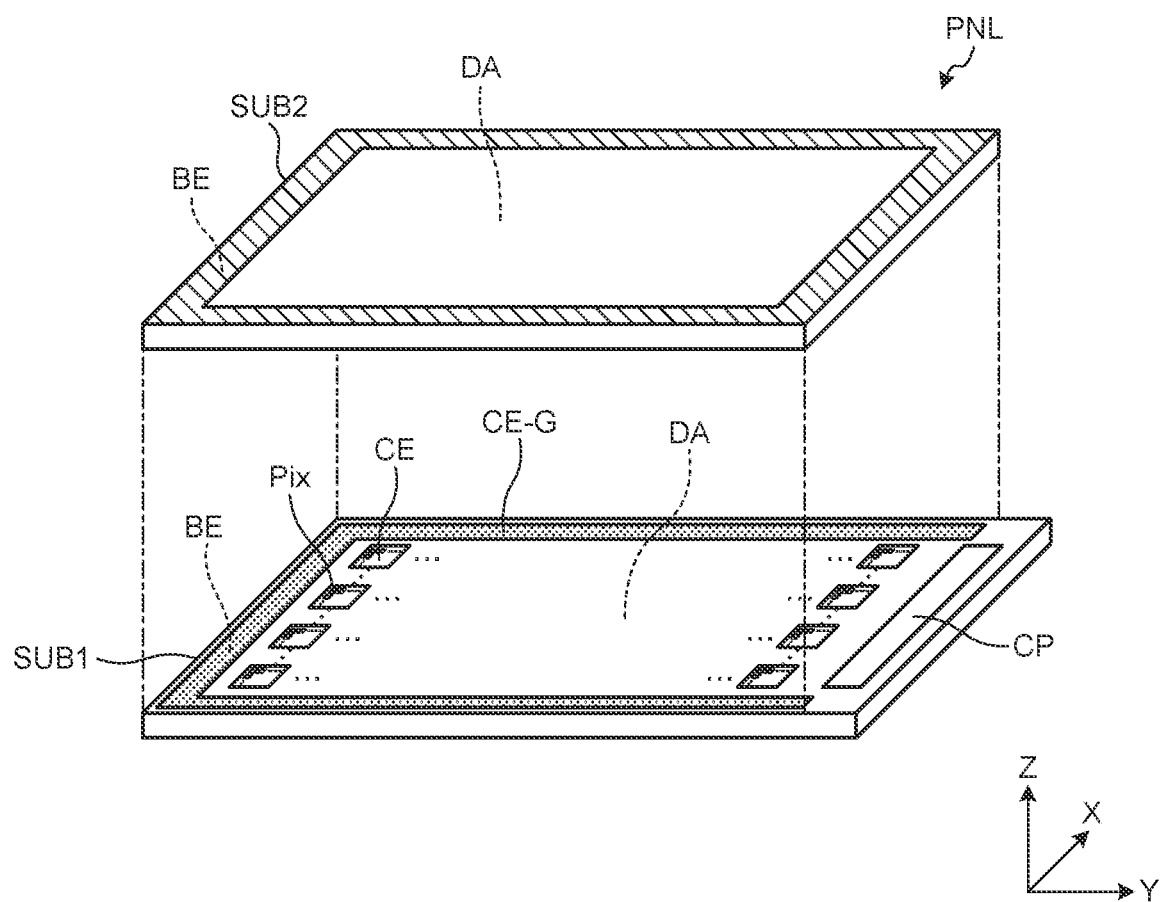
FIG. 1 is an exploded perspective view of a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. The components described below may be appropriately combined. What is disclosed herein is given by way of example only, and appropriate modifications made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present disclosure and the figures, components similar to those previously described with reference to previous figures are denoted by like reference numerals, and detailed explanation thereof may be appropriately omitted.

First Embodiment

FIG. 1 is an exploded perspective view of a display device according to a first embodiment. As illustrated in FIG. 1, a display device PNL includes an array substrate SUB1 and a counter substrate SUB2. As illustrated in FIG. 1, the display device PNL has a peripheral region BE outside a display region DA. While the display region DA has a rectangular shape, the outer shape of the display region DA is not particularly limited. The display region DA may have a cut-out or have another polygonal shape, for example. The display region DA may have another shape, such as a circular or elliptic shape.

A first direction X according to the present embodiment extends along the short side of the display region DA. A second direction Y intersects (or is orthogonal to) the first direction X. The first direction X and the second direction Y are not limited thereto, and the second direction Y may intersect the first direction X at an angle other than 90 degrees. The plane defined by the first direction X and the second direction Y is parallel to the surface of the array substrate SUB1. A third direction Z orthogonal to the first direction X and the second direction Y is the thickness direction of the array substrate SUB1.

The display region DA is a region for displaying images and overlaps a plurality of pixels Pix. The peripheral region BE is positioned on the inner side than the outer periphery of the array substrate SUB1 and on the outer side than the display region DA. The peripheral region BE may have a frame shape surrounding the display region DA. In this case, the peripheral region BE may also be referred to as a frame region.

The display region DA that displays images includes a sensor region included in a detection device that detects capacitance. As illustrated in FIG. 1, a plurality of detection electrodes CE are arrayed in a matrix (row-column configuration) in the first direction X and the second direction Y in the display region DA. The detection electrodes CE each have a rectangular or square shape schematically in planar view. The shape of the detection electrodes CE will be described later in greater detail. The detection electrodes CE are made of a translucent conductive material, such as indium tin oxide (ITO).

As illustrated in FIG. 1, the peripheral region BE on a first surface of the array substrate SUB1 is provided with outer edge wires CE-G and an integrated circuit CP. The outer edge wires CE-G, for example, are provided continuously along the long sides and a short side of the display region DA and surrounds the display region DA.

The display device PNL is a display device with a sensor and integrates the sensor region with the display region DA. Specifically, in the display device PNL, a part of the members in the display region DA serves as the detection electrodes CE in the sensor region.

Figure 2:
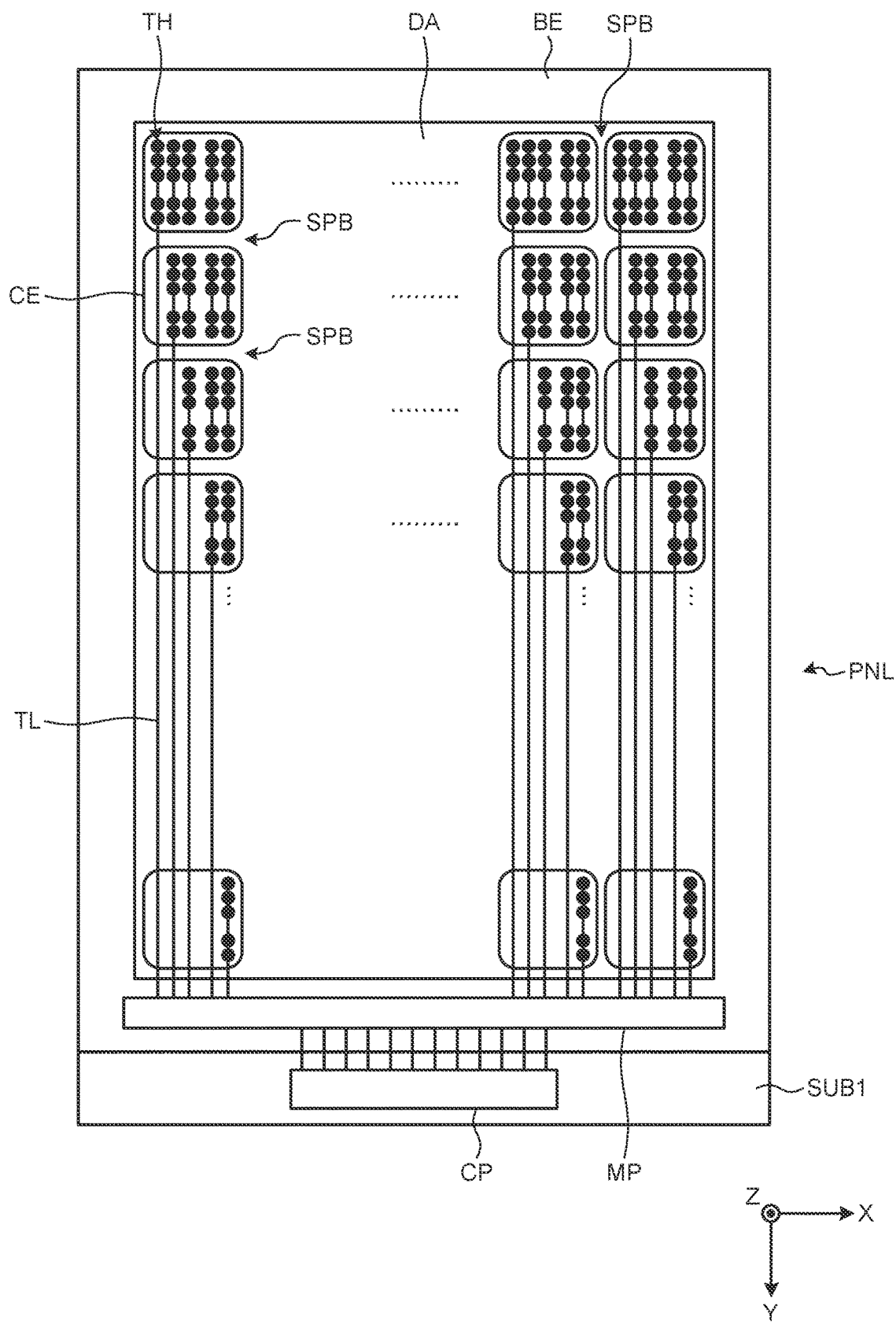
FIG. 2 is a plan view schematically illustrating an array substrate.

FIG. 2 is a plan view schematically illustrating the array substrate. As illustrated in FIG. 2, the detection electrodes CE are divided into a matrix (row-column configuration) in the first direction X and the second direction Y by slits SPB. A coupling circuit MP and the integrated circuit CP are provided on a short side of the peripheral region BE. A flexible substrate, which is not illustrated, is coupled to the short side of the peripheral region BE. The positions of the coupling circuit MP and the integrated circuit CP are not limited thereto, and they may be provided on a control substrate outside the module or the flexible substrate, for example.

The detection electrodes CE are electrically coupled to the integrated circuit CP via metal wires TL and the coupling circuit MP. The metal wires TL supply a drive signal to be supplied to the detection electrodes CE, and send a signal corresponding to a change in capacitance to an analog front end. The metal wires TL are electrically coupled to the respective detection electrodes CE disposed in the display region DA and extend to the peripheral region BE. The metal wires TL extend along the second direction Y and are disposed side by side in the first direction X. A drive circuit included in the integrated circuit CP, for example, is coupled to the detection electrodes CE via the coupling circuit MP disposed in the peripheral region BE and the metal wires TL.

Contact holes TH each have a coupling part CT (refer to FIGS. 10 to 12) at which the detection electrode CE and the metal wire TL overlapping the detection electrode CE are electrically coupled. In FIG. 2, one metal wire TL is schematically coupled to one detection electrode CE. In an actual configuration, the metal wires TL each include a plurality of wires and extend in the display region DA, which will be described later.

The display device PNL includes the coupling circuit MP. The coupling circuit MP is provided between the detection electrodes CE and the integrated circuit CP. The coupling circuit MP switches coupling and decoupling the detection electrode CE to be a target of detection drive to and from the integrated circuit CP based on control signals supplied from the integrated circuit CP. The coupling circuit MP includes analog front ends.

Figure 3:
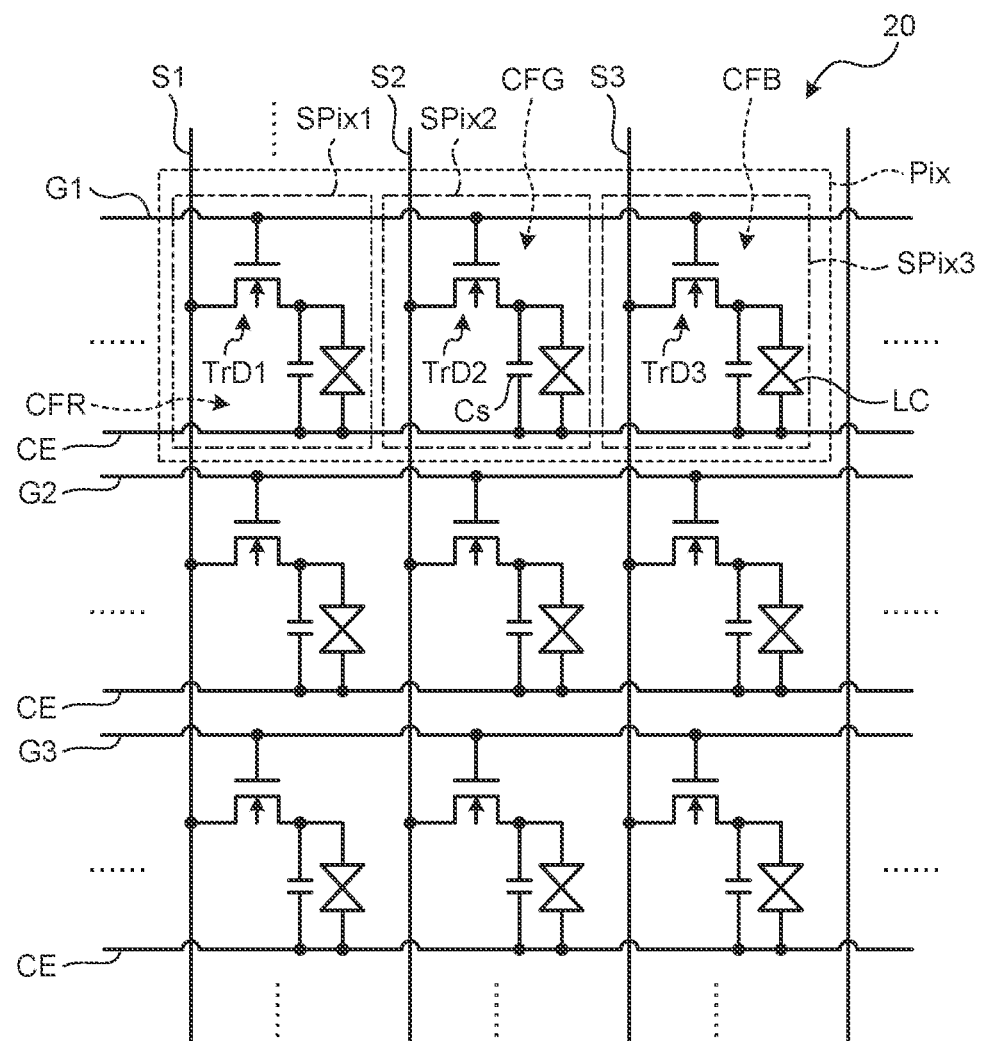
FIG. 3 is a circuit diagram of a pixel array in a display region according to the first embodiment.

FIG. 3 is a circuit diagram of a pixel array in the display region according to the first embodiment. In the following description, a plurality of scanning lines G1, G2, and G3 may be collectively referred to as scanning lines GL. A plurality of signal lines S1, S2, and S3 may be collectively referred to as signal lines SL. The array substrate SUB1 is provided with switching elements TrD1, TrD2, and TrD3 of sub-pixels SPix1, SPix2, and SPix3, the signal lines SL, the scanning lines GL, and other components illustrated in FIG. 3. The signal lines S1, S2, and S3 are wires that supply pixel signals to pixel electrodes PE1, PE2, and PE3 (refer to FIG. 4), respectively. The scanning lines G1, G2, and G3 are wires that supply gate signals for driving the switching elements TrD1, TrD2, and TrD3.

As illustrated in FIG. 3, the pixels Pix in the display region DA illustrated in FIG. 1 each include the sub-pixels SPix1, SPix2, and SPix3 arrayed in a matrix (row-column configuration). In the following description, the sub-pixels SPix1, SPix2, and SPix3 may be collectively referred to as sub-pixels SPix. The sub-pixels SPix1, SPix2, and SPix3 include the switching elements TrD1, TrD2, and TrD3, respectively, and capacitance of a liquid crystal layer LC. The switching elements TrD1, TrD2, and TrD3 are thin-film transistors and are n-channel metal oxide semiconductor (MOS) TFTs in this embodiment. A sixth insulating film 16 (refer to FIG. 6) is provided between the pixel electrodes PE1, PE2, and PE3, which will be described later, and the detection electrode CE, thereby forming holding capacitance Cs illustrated in FIG. 3.

Color filters CFR, CFG, and CFB illustrated in FIG. 3 are cyclically arrayed color regions in three colors of red (R), green (G), and blue (B), for example. The color regions in the three colors of R, G, and B serve as a set and correspond to the respective sub-pixels SPix1, SPix2, and SPix3 illustrated in FIG. 3. A set of the sub-pixels SPix1, SPix2, and SPix3 corresponding to the respective color regions in the three colors serves as one pixel Pix. The color filters may include color regions in four or more colors.

Figure 4:
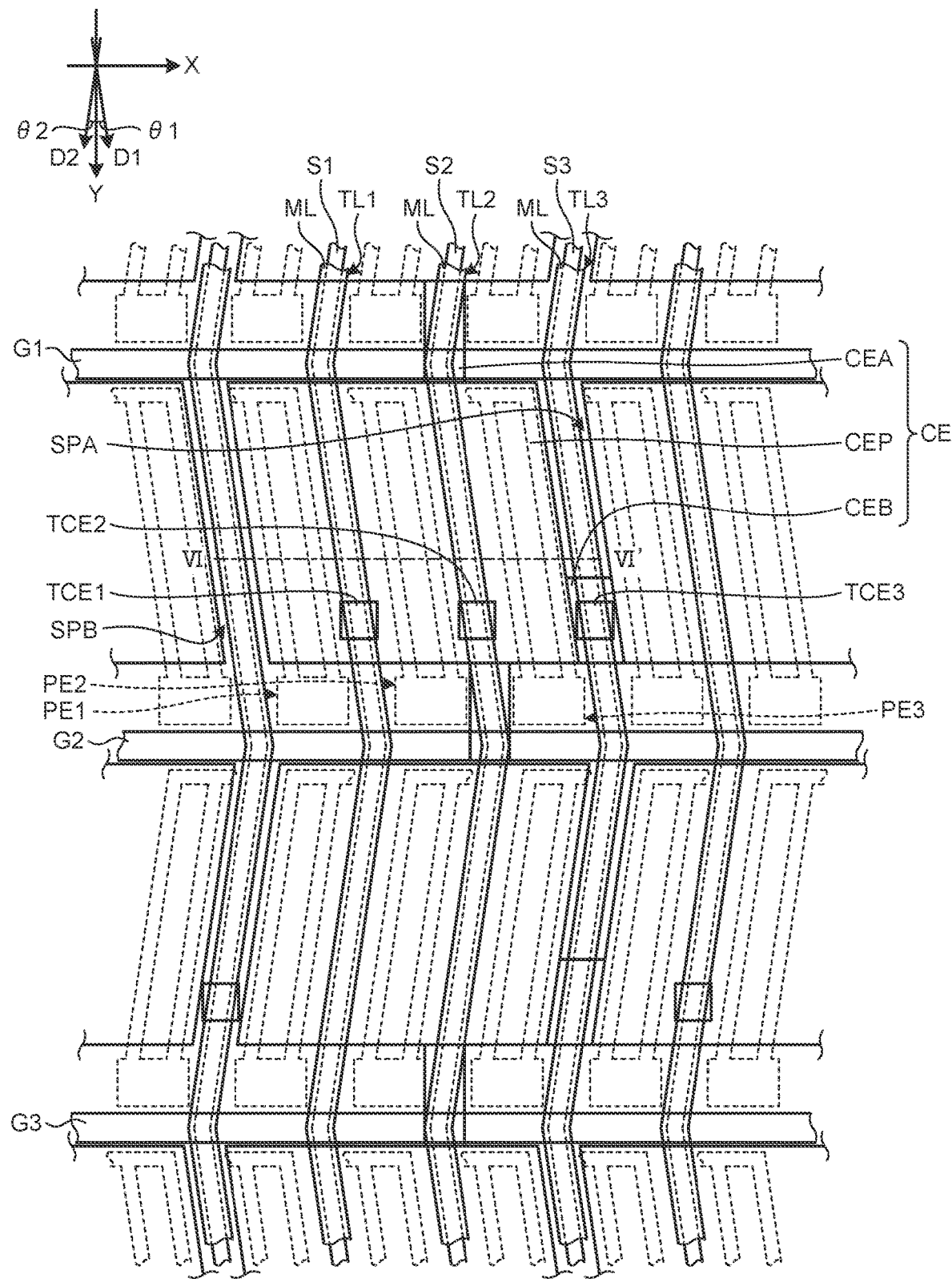
FIG. 4 is a plan view for explaining detection electrodes in a schematic plan view of pixels.
Figure 5:
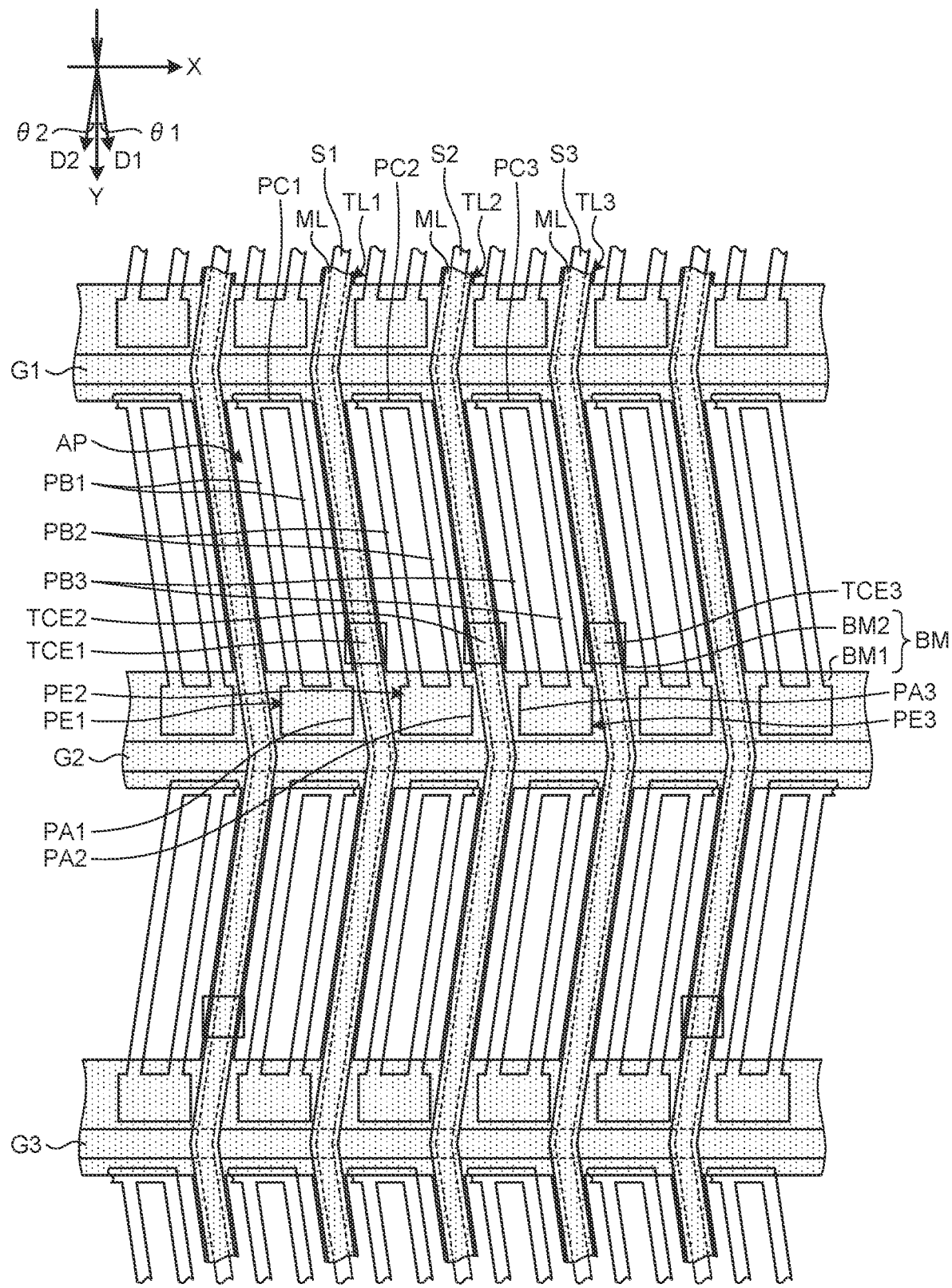
FIG. 5 is a plan view for explaining pixel electrodes in the schematic plan view of the pixels.
Figure 6:
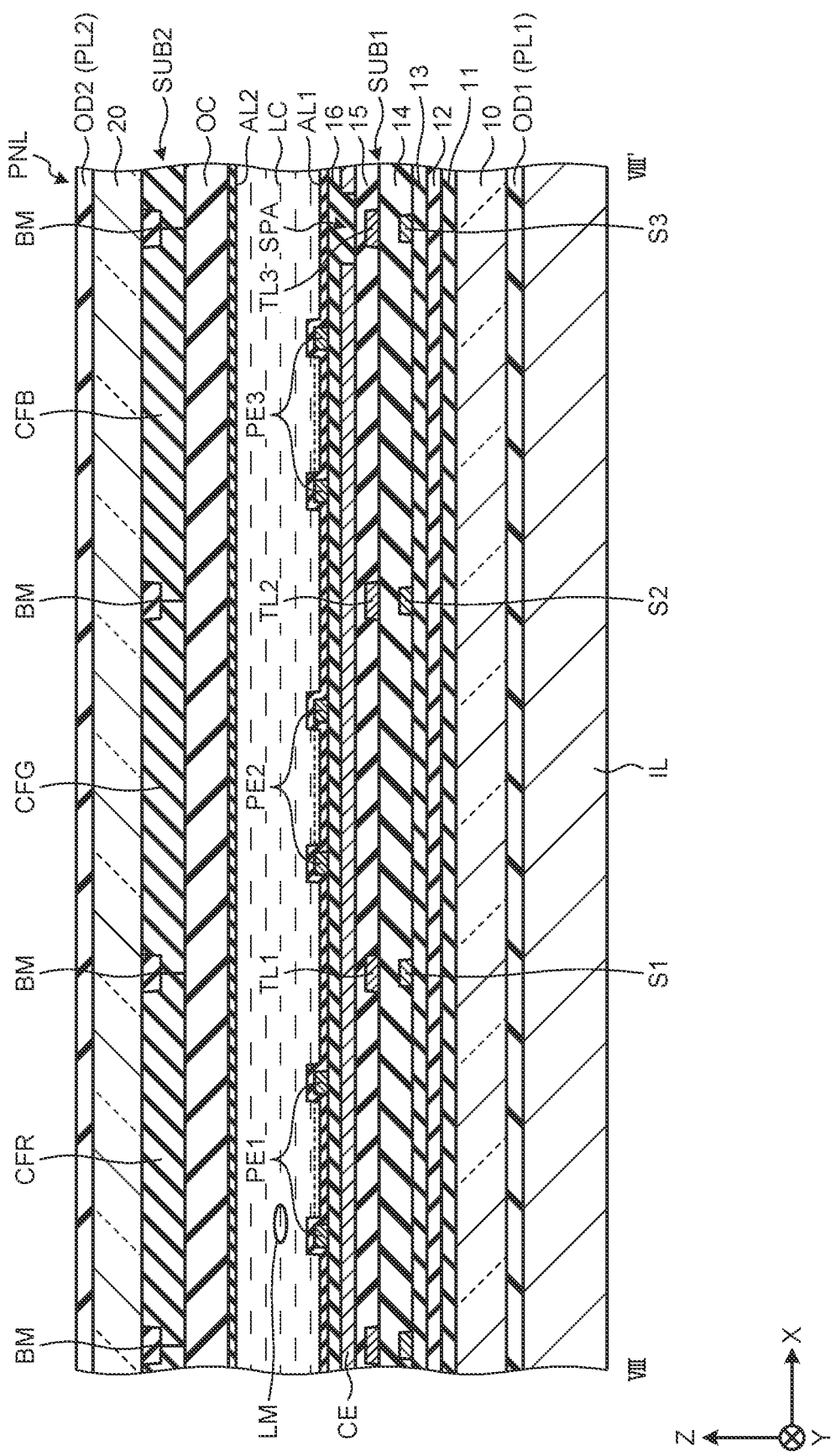
FIG. 6 is a partial sectional view for explaining the VI-VI' section in FIG. 4.
Figure 7:
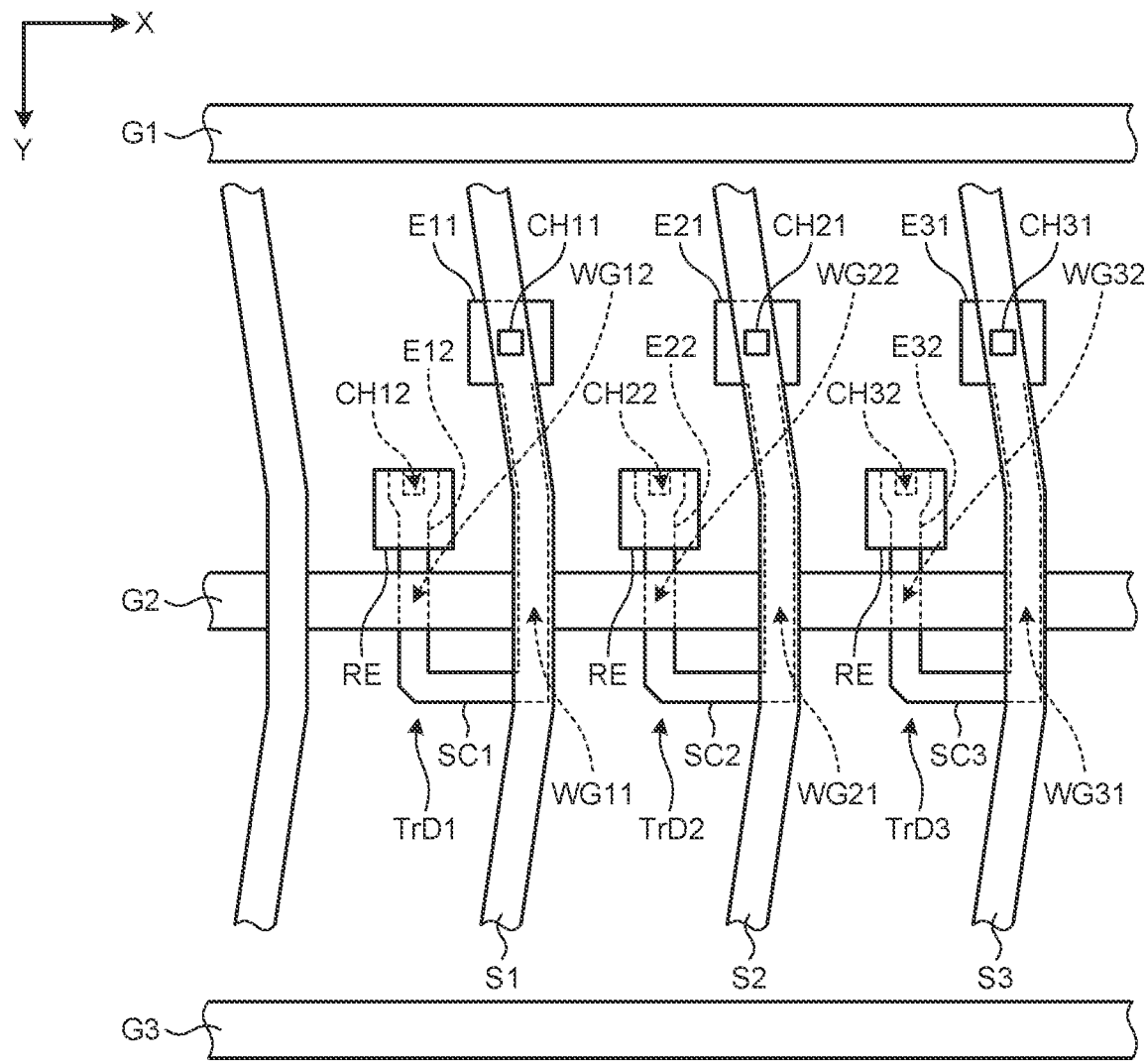
FIG. 7 is a plan view for explaining switching elements according to the first embodiment.
Figure 8:
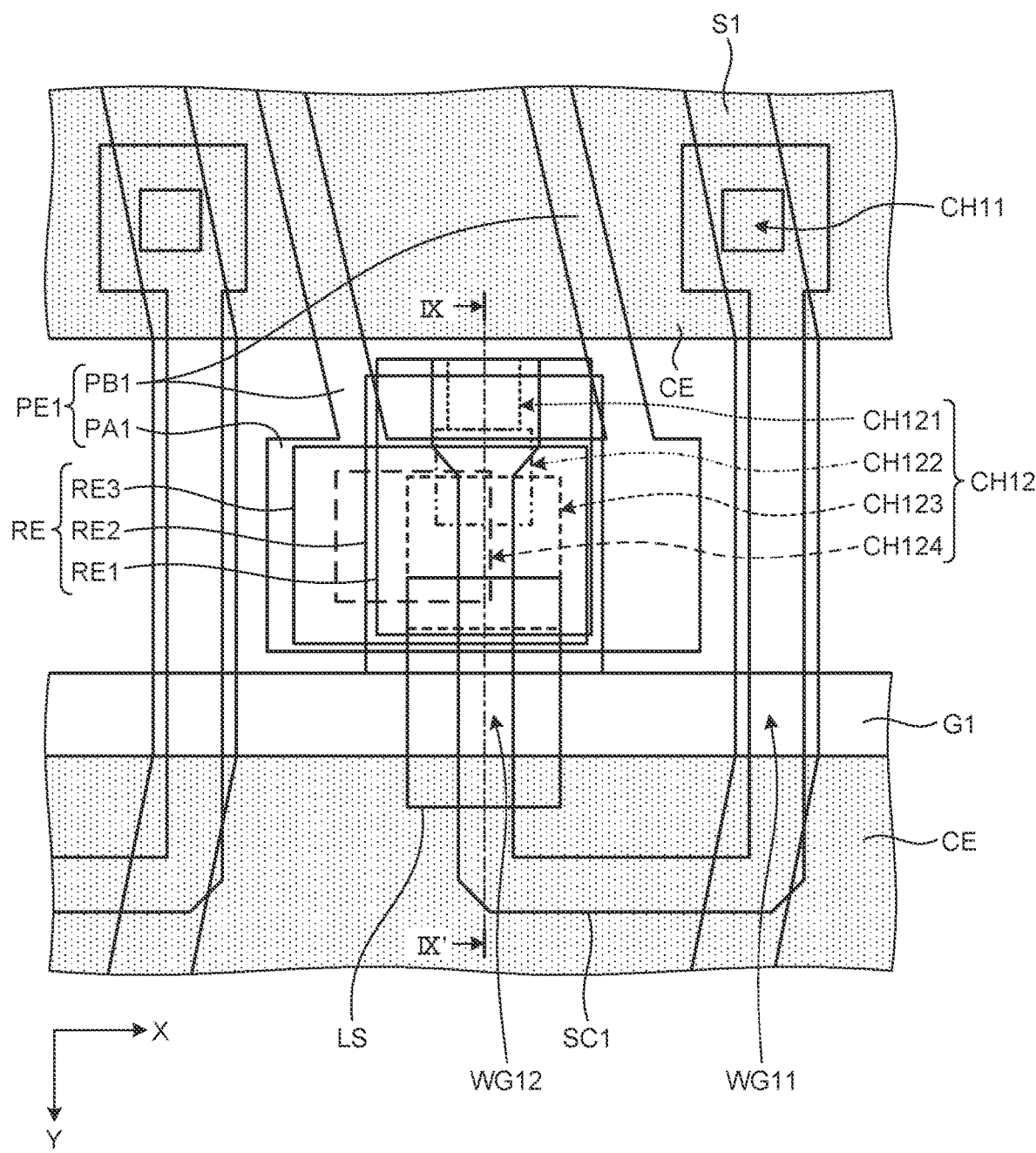
FIG. 8 is a plan view for explaining contact holes according to the first embodiment.
Figure 9:
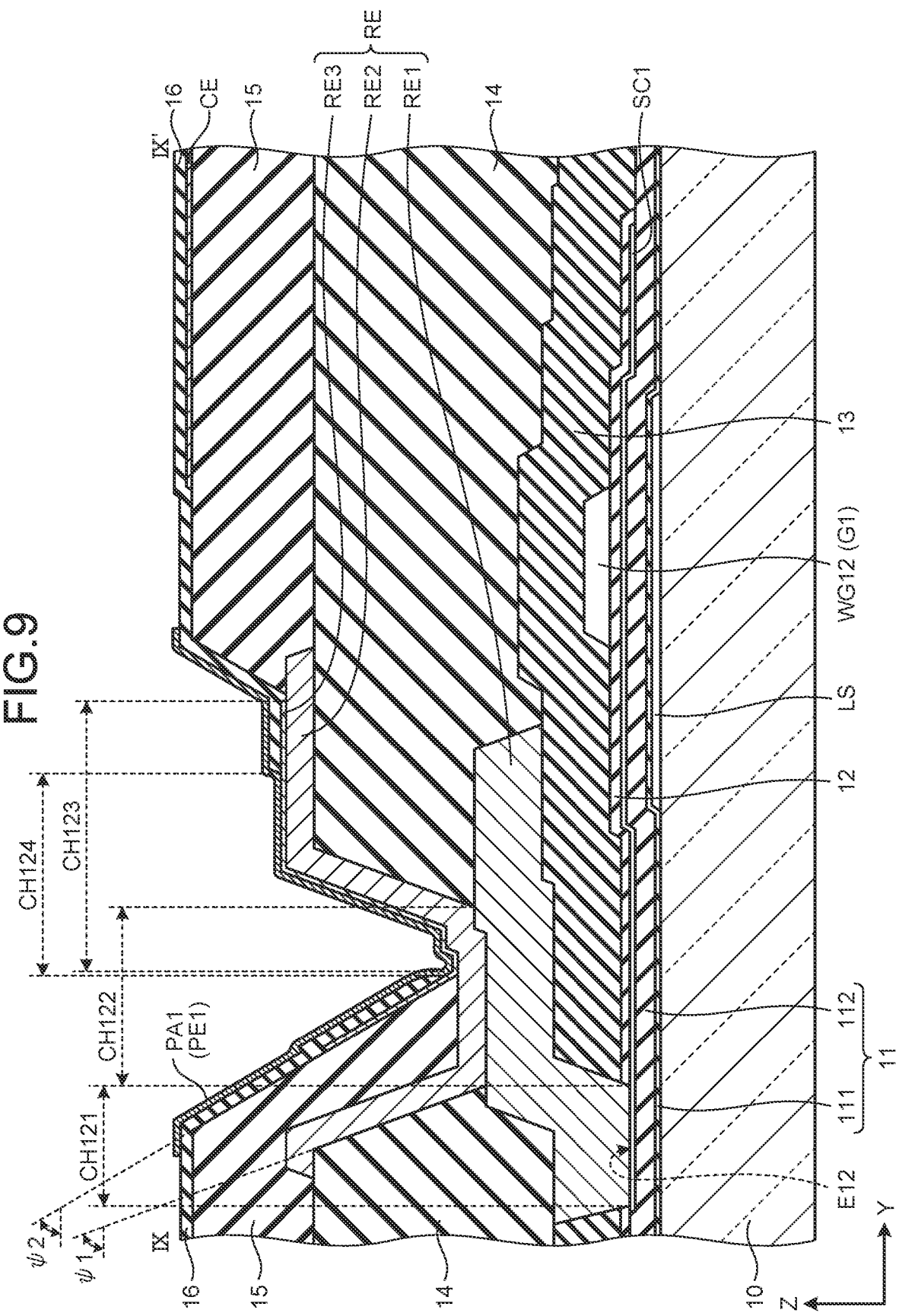
FIG. 9 is a partial sectional view for explaining the IX-IX' section in FIG. 8.
Figure 10:
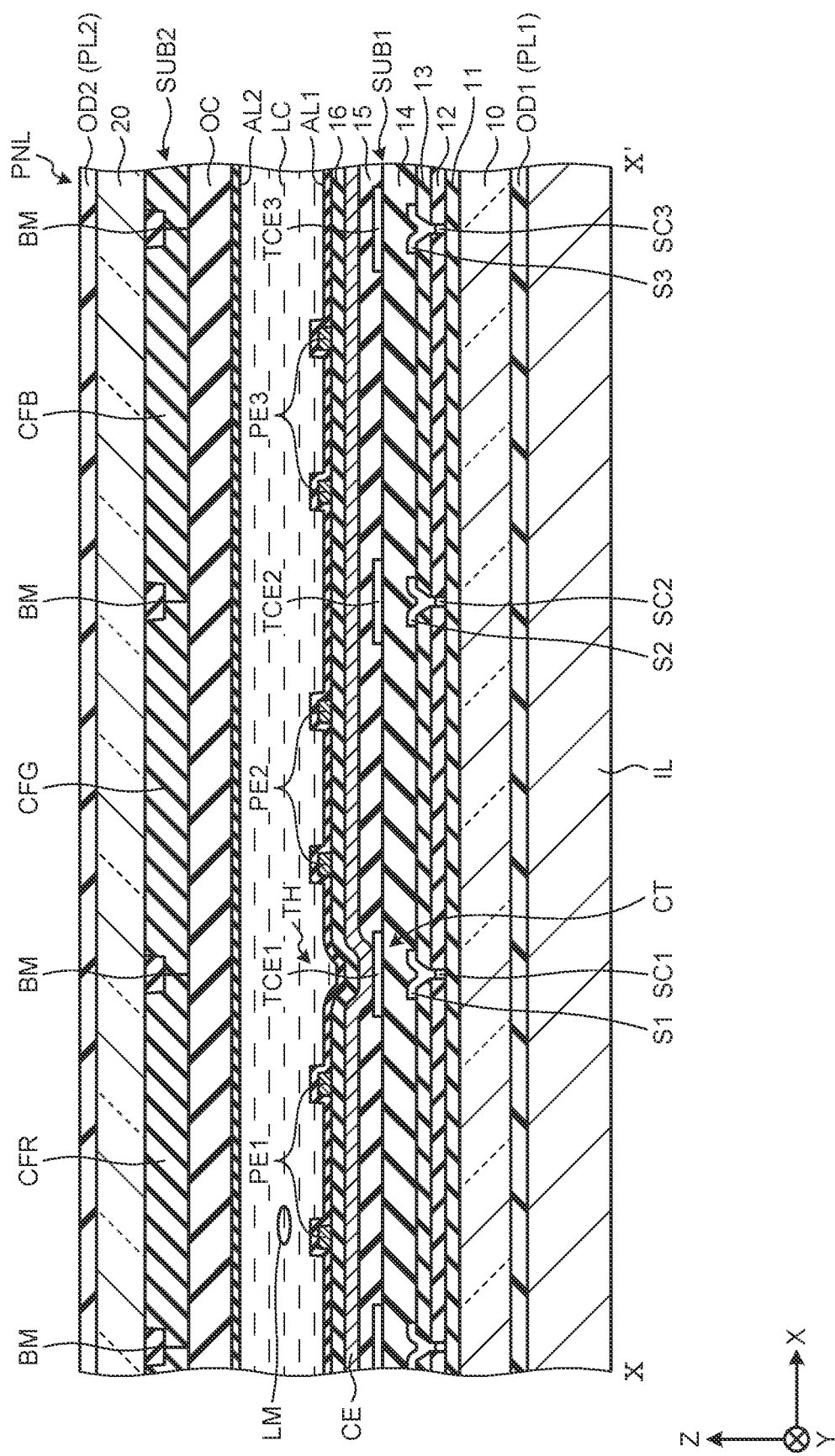
FIG. 10 is a sectional view for explaining widened parts of metal wires.
Figure 11:
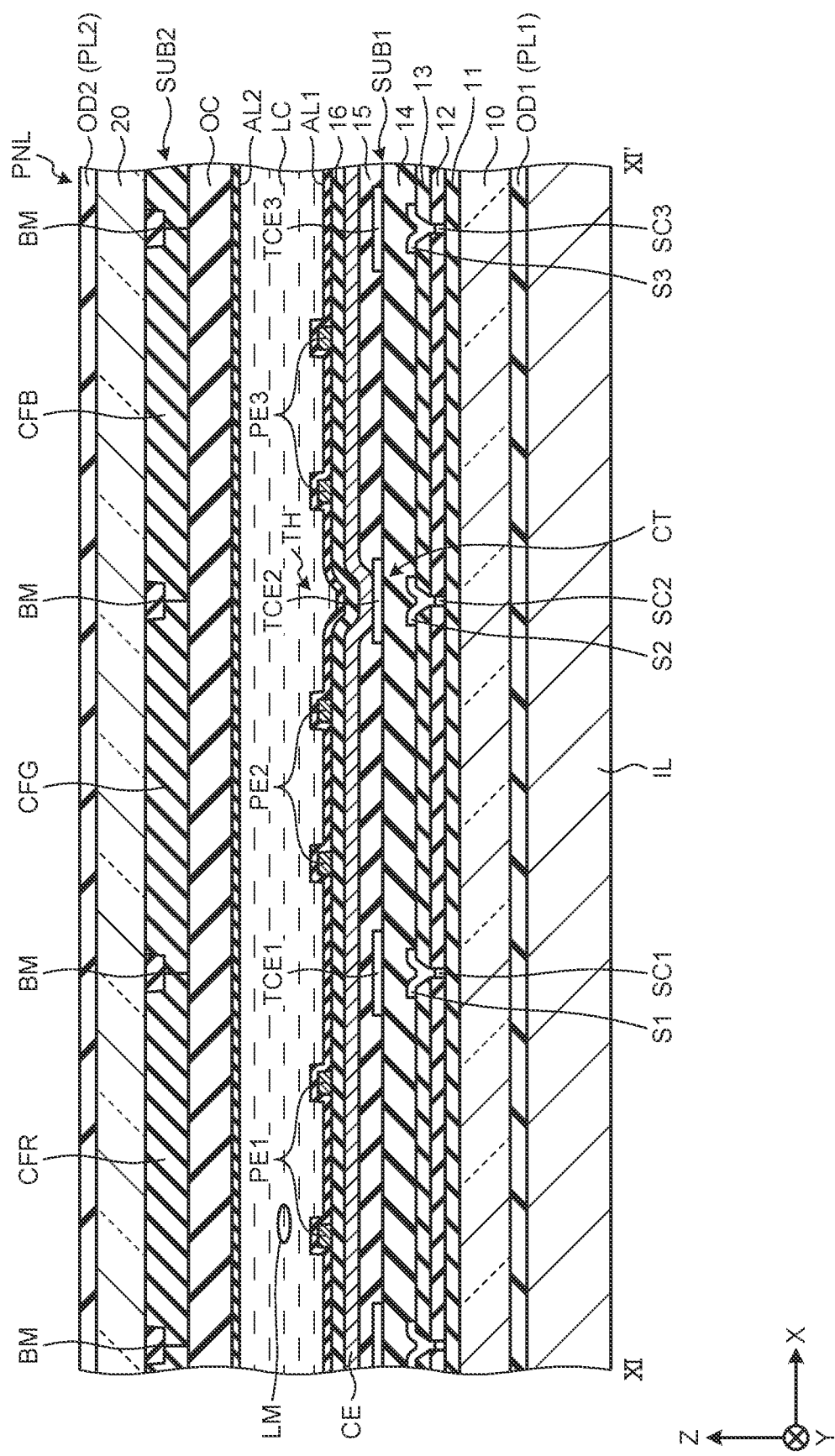
FIG. 11 is a sectional view for explaining widened parts of sensor wires.
Figure 12:
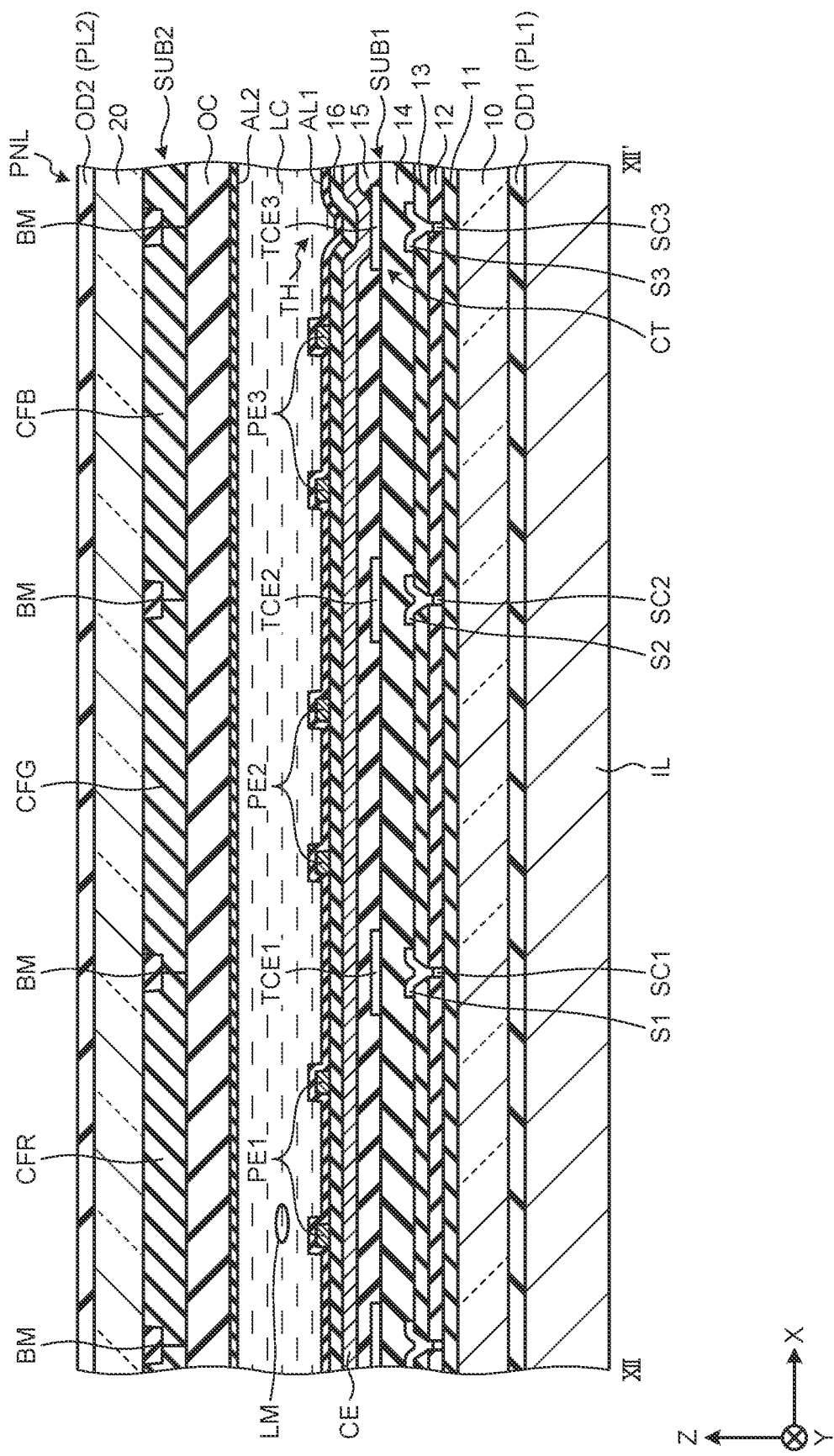
FIG. 12 is a sectional view for explaining widened parts of metal wires.

FIG. 4 is a plan view for explaining the detection electrodes in a schematic plan view of the pixels. FIG. 5 is a plan view for explaining the pixel electrodes in the schematic plan view of the pixels. FIG. 6 is a partial sectional view for explaining the VI-VI' section in FIG. 4. FIG. 7 is a plan view for explaining the switching elements according to the first embodiment. FIG. 8 is a plan view for explaining contact holes according to the first embodiment. FIG. 9 is a partial sectional view for explaining the IX-IX' section in FIG. 8. FIGS. 10 to 12 are sectional views for explaining widened parts of metal wires. FIG. 13 is a plan view for explaining widened parts of metal wires. FIG. 13 is a diagram for explaining the widened parts of the metal wires. The following describes the specific display device according to the first embodiment with reference to FIGS. 1 to 13.

As illustrated in FIG. 6, the signal lines S1, S2, and S3, the pixel electrodes PE1, PE2, and PE3, the detection electrodes CE, and a plurality of metal wires TL1, TL2, and TL3 are provided on a first insulating substrate 10. In the following description, the metal wires TL1, TL2, and TL3 may be collectively referred to as a metal wire TL. In the following description, the pixel electrodes PE1, PE2, and PE3 may be collectively referred to as a pixel electrode PE. As illustrated in FIG. 4, the scanning lines G1 to G3 extend along the first direction X and are disposed side by side at regular pitches in the second direction Y. While the scanning lines G1 to G3 are not illustrated in FIG. 6, they are also provided on the first insulating substrate 10.

In FIGS. 4 and 5, D1 is defined as a direction intersecting the second direction Y counter-clockwisely at an acute angle, and D2 is defined as a direction intersecting the second direction Y clockwisely at an acute angle. An angle θ1 between the second direction Y and the direction D1 is substantially equal to an angle θ2 between the second direction Y and the direction D2. The signal lines S1 to S3 extend approximately along the second direction Y and are disposed side by side at regular pitches in the first direction X. In the illustrated example, the signal lines S1 to S3 extend in the direction D1 between the scanning line G1 and the scanning line G2 and in the direction D2 between the scanning line G2 and the scanning line G3. The scanning lines G1 to G3 and the signal lines S1 to S3 intersect each other in a planar view of the X-Y plane.

As illustrated in FIG. 7, the switching element TrD1 is positioned near the intersection of the scanning line G2 and the signal line S1 and electrically coupled to the scanning line G2 and the signal line S1. The switching element TrD2 is positioned near the intersection of the scanning line G2 and the signal line S2 and electrically coupled to the scanning line G2 and the signal line S2. The switching element TrD3 is positioned near the intersection of the scanning line G2 and the signal line S3 and electrically coupled to the scanning line G2 and the signal line S3.

As illustrated in FIG. 5, the pixel electrodes PE1, PE2, and PE3 are disposed side by side in the first direction X with gaps interposed therebetween. The pixel electrode PE1 is positioned between two signal lines SL. The pixel electrodes PE1, PE2, and PE3 are disposed side by side in the second direction Y with gaps interposed therebetween. The pixel electrode PE1 is positioned between two scanning lines GL. The plurality of pixel electrodes PE1, PE2, and PE3 are located in an area surrounded by corresponding two signal lines SL and corresponding two scanning lines GL.

The pixel electrode PE1 has a contact part PA1, electrode parts PB1, and a connecting part PC1. The contact part PA1 is electrically coupled to the switching element TrD1 (refer to FIG. 7). The electrode part PB1 extends from the contact part PA1 to the side closer to the scanning line G1, which is the opposite side to the scanning line G2. The electrode part PB1 may also be referred to as a strip electrode, a linear electrode, or a comb electrode, for example. In FIG. 5, one pixel electrode PE1 includes two electrode parts PB1. The two electrode parts PB1 are coupled to the contact part PA1. The electrode parts PB1 are disposed side by side in the first direction X with a gap interposed therebetween. The connecting part PC1 is coupled to the ends of the two electrode parts PB1. If part of a first electrode part PB1 is broken, this structure can supply a pixel potential to the first electrode part PB1 from a second electrode part PB1 via the connecting part PC1.

The shape of the pixel electrode PE1 is not limited to that in the example illustrated in FIG. 5. The pixel electrode PE1 does not necessarily have the connecting part PC1, and the number of electrode parts PB1 may be not two but three or four, for example.

The pixel electrode PE2 has substantially the same shape as that of the pixel electrode PE1. The pixel electrode PE2 is positioned between two signal lines. The pixel electrode PE2 has a contact part PA2, electrode parts PB2, and a connecting part PC2. The contact part PA2 is electrically coupled to the switching element TrD2 (refer to FIG. 7). The electrode parts PB2 extend from the contact part PA2 toward the scanning line G1.

The pixel electrode PE3 has substantially the same shape as that of the pixel electrode PE1. The pixel electrode PE3 is positioned between two signal lines. The pixel electrode PE3 has a contact part PA3, electrode parts PB3, and a connecting part PC3. The contact part PA3 is electrically coupled to the switching element TrD3 (refer to FIG. 7). The electrode parts PB3 extend from the contact part PA3 toward the scanning line G1.

All of the electrode parts PB1, PB2, and PB3 extend in the same direction parallel to the direction D1. All of the electrode parts PB1, PB2, and PB3 extend from the respective contact parts toward the scanning line G1. While the pixel electrodes positioned between the scanning lines G2 and G3 have the same structure as that of the pixel electrodes PE1 to PE3, their electrode parts extend along the direction D2.

As illustrated in FIG. 4, the detection electrode CE includes a main detection electrode CEP, a sub-detection electrode CEA, and a sub-detection electrode CEB. The main detection electrodes CEP are provided on substantially the whole display region DA (refer to FIG. 1) of the array substrate SUB1. In other words, the sub-pixels include the pixel electrodes PE1, PE2, and PE3, and the main detection electrode CEP (detection electrode CE) is provided in a region overlapping the pixel electrodes PE1, PE2, and PE3. In a planar view of the X-Y plane, the main detection electrode CEP overlaps the pixel electrodes PE1, PE2, and PE3, the signal lines S1, S2, and S3, and the metal wires TL1 and TL2 but does not overlap the scanning lines G1, G2, and G3.

As illustrated in FIG. 4, the sub-detection electrode CEA extends in the second direction Y and electrically couples the main detection electrodes CEP disposed side by side in the second direction Y. In a planar view of the X-Y plane, the sub-detection electrode CEA overlaps the scanning lines G1, G2, and G3, the signal line S2, and the metal wire TL2 but does not overlap the pixel electrodes PE1, PE2, and PE3, the signal lines S1 and S3, or the metal wires TL1 and TL3. If no sub-detection electrode CEA is provided between the main detection electrodes CEP disposed side by side in the second direction Y, a slit SPB is formed.

As illustrated in FIG. 4, the sub-detection electrode CEB extends in the first direction X and electrically couples the main detection electrodes CEP disposed side by side in the first direction X. As illustrated in FIG. 4, if no sub-detection electrode CEB is provided between the main detection electrodes CEP disposed side by side in the first direction X, the slit SPB is formed. In a planar view of the X-Y plane, the sub-detection electrode CEB overlaps the signal line S3, the metal wire TL3, and a widened part TCE3 but does not overlap the pixel electrodes PE1, PE2, and PE3, the scanning line G1, G2, and G3, the signal lines S1 and S2, or the metal wires TL1 and TL2. The sub-detection electrode CEB overlaps the widened part TCE3 and forms a slit SPA. The sub-detection electrode CEB thus can reduce the difference in visibility between the slit SPA and the slit SPB formed between the detection electrodes CE disposed side by side in the first direction X, thereby reducing parasitic capacitance generated between the detection electrode CE and the metal wire TL.

As described above, the detection electrode CE includes the main detection electrode CEP and the sub-detection electrodes CEA and CEB. The main detection electrode CEP has an island shape. The main detection electrodes CEP disposed side by side in the first direction X or the second direction Y are electrically coupled by the sub-detection electrode CEA or CEB. As a result, the detection electrode CE can have a desired area.

In a planar view of the X-Y plane, the metal wires TL1, TL2, and TL3 overlap the signal lines S1, S2, and S3, respectively, and extend in parallel with these signal lines.

In FIG. 6, the array substrate SUB1 includes the translucent first insulating substrate 10, such as a glass substrate and a resin substrate, serving as a base. The array substrate SUB1 includes a first insulating film 11, a second insulating film 12, a third insulating film 13, a fourth insulating film 14, a fifth insulating film 15, the sixth insulating film 16, the signal lines S1 to S3, the pixel electrodes PE1 to PE3, the detection electrode CE, a first orientation film AL1, and other components on the first insulating substrate 10 on the side facing the counter substrate SUB2. In the following description, a direction from the array substrate SUB1 to the counter substrate SUB2 is referred to as an upper side or simply referred to as up.

The first insulating film 11 is positioned on the first insulating substrate 10. The second insulating film 12 is positioned on the first insulating film 11. The third insulating film 13 is positioned on the second insulating film 12. The signal lines S1 to S3 are positioned on the third insulating film 13. The fourth insulating film 14 is positioned on the third insulating film 13 and covers the signal lines S1 to S4.

The metal wires TL1, TL2, and TL3 are positioned on the fourth insulating film 14. The metal wires TL1, TL2, and TL3 are made of a metal material including any one of Al, Mo, and W. The metal wires TL1, TL2, and TL3 have lower resistance than that of the detection electrode CE and have conductivity. The metal wires TL1, TL2, and TL3 face the signal lines S1, S2, and S3, respectively, with the fourth insulating film 14 interposed therebetween. In other words, the metal wires TL1, TL2, and TL3 overlap the signal lines S1, S2, and S3, respectively. The metal wires TL1, TL2, TL3 are covered with the fifth insulating film 15. The first insulating film 11, the second insulating film 12, the third insulating film 13, and the sixth insulating film 16 are made of a translucent inorganic material, such as a silicon oxide or a silicon nitride. The fourth insulating film 14 and the fifth insulating film 15 are made of a translucent resin material such as acrylate resin and have a thickness larger than that of the other insulating films made of the inorganic material. The fourth insulating film 14 serves as a first organic insulating film, and the fifth insulating film 15 serves as a second organic insulating film. For example, the fourth insulating film 14 is 2 μm or more and 3 μm or less. The fifth insulating film 15 is 1 μm or more and 2 μm or less. The fourth insulating film 14 is formed thicker than the fifth insulating film 15.

The detection electrode CE is positioned on the fifth insulating film 15. In FIG. 6, the detection electrode CE faces the metal wires TL1 and TL2 with the fifth insulating film 15 interposed therebetween. In FIG. 6, the slit SPA between the detection electrodes CE is positioned right above the metal wire TL3. The detection electrode CE is covered with the sixth insulating film 16. The sixth insulating film 16 is made of a translucent inorganic material, such as a silicon oxide or a silicon nitride.

The pixel electrodes PE1 to PE3 are positioned on the sixth insulating film 16 and face the detection electrode CE with the sixth insulating film 16 interposed therebetween. The pixel electrodes PE1 to PE3 and the detection electrode CE are made of a translucent conductive material, such as ITO and indium zinc oxide (IZO). The pixel electrodes PE1 to PE3 are covered with the first orientation film AL1. The first orientation film AL1 also covers the sixth insulating film 16.

The counter substrate SUB2 includes a translucent second insulating substrate 20, such as a glass substrate and a resin substrate, serving as a base. The counter substrate SUB2 includes a light-shielding layer BM, the color filters CFR, CFG, and CFB, an overcoat layer OC, a second orientation film AL2, and other components on the second insulating substrate 20 on the side facing the array substrate SUB1.

As illustrated in FIG. 6, the light-shielding layer BM is positioned on the second insulating substrate 20 on the side facing the array substrate SUB1. As illustrated in FIG. 5, the light-shielding layer BM defines openings AP facing the pixel electrodes PE1 to PE3. The light-shielding layer BM is made of a black resin material or a light-shielding metal material.

The color filters CFR, CFG, and CFB are positioned on the second insulating substrate 20 on the side facing the array substrate SUB1. Ends of the color filters CFR, CFG, and CFB overlap the light-shielding layer BM. The color filter CFR faces the pixel electrode PE1. The color filter CFG faces the pixel electrode PE2. The color filter CFB faces the pixel electrode PE3. The color filters CFR, CFG, and CFB are made of resin materials in red, green, and blue, respectively, for example.

The overcoat layer OC covers the color filters CFR, CFG, and CFB. The overcoat layer OC is made of a translucent resin material. The second orientation film AL2 covers the overcoat layer OC. The first orientation film AL1 and the second orientation film AL2 are made of a horizontally oriented material, for example.

The light-shielding layer BM may be formed between any of the color filters CFR, CFG, and CFB and the overcoat layer OC, and the light-shielding layer BM may be formed between the overcoat layer OC and the second orientation film AL2.

As described above, the counter substrate SUB2 includes the light-shielding layer BM, the color filters CFR, CFG, and CFB, and other components. The light-shielding layer BM is disposed in a region facing the wires, such as the scanning lines G1, G2, and G3, the signal lines S1, S2, and S3, the contact parts PA1, PA2, and PA3, and the switching elements TrD1, TrD2, and TrD3 illustrated in FIG. 4.

While the counter substrate SUB2 includes the color filters CFR, CFG, and CFB in three colors in FIG. 6, it may include color filters in four or more colors different from red, green, and blue such as white, transparent, yellow, magenta, and cyan. The color filters CFR, CFG, and CFB may be provided to the array substrate SUB1.

The array substrate SUB1 and the counter substrate SUB2 are disposed with the first orientation film AL1 and the second orientation film AL2 facing each other. The liquid crystal layer LC is sealed between the first orientation film AL1 and the second orientation film AL2. The liquid crystal layer LC is made of a negative liquid crystal material having negative dielectric anisotropy or a positive liquid crystal material having positive dielectric anisotropy.

The array substrate SUB1 faces a backlight unit IL, and the counter substrate SUB2 is positioned on the display surface side. The backlight unit IL may have various kinds of forms, and the detailed explanation of the configuration of the backlight unit IL is omitted.

A first optical element OD1 including a first polarizing plate PL1 is disposed on the outer surface of the first insulating substrate 10 or the surface facing the backlight unit IL. A second optical element OD2 including a second polarizing plate PL2 is disposed on the outer surface of the second insulating substrate 20 or the surface on the observation position side. A first polarization axis of the first polarizing plate PL1 and a second polarization axis of the second polarizing plate PL2 are in a cross-Nicol positional relation on the X-Y plane, for example. The first optical element OD1 and the second optical element OD2 may include other optical functional elements, such as a phase-contrast plate.

Let us assume a case where the liquid crystal layer LC is made of a negative liquid crystal material, for example. When no voltage is applied to the liquid crystal layer LC, liquid crystal molecules LM are initially oriented with their long axes extending along the first direction X on the X-Y plane. By contrast, when a voltage is applied to the liquid crystal layer LC, that is, in an on-state when an electric field is formed between the pixel electrodes PE1 to PE3 and the detection electrode CE, the orientation state of the liquid crystal molecules LM changes because of the effects of the electric field. In the on-state, the polarization state of incident linearly polarized light changes depending on the orientation state of the liquid crystal molecules LM when passing through the liquid crystal layer LC.

The following describes the configuration of the switching elements TrD1, TrD2, and TrD3 illustrated in FIG. 7 in greater detail. The switching elements TrD1, TrD2, and TrD3 described below are top-gate elements. The switching elements TrD1, TrD2, and TrD3 may be bottom-gate elements. FIG. 7 illustrates only major parts required for the explanation of the switching elements TrD1, TrD2, and TrD3 and does not illustrate the detection electrode CE, the pixel electrodes PE1 to PE3, the metal wires TL1 to TL3, or other components.

The switching elements TrD1, TrD2, and TrD3 are disposed side by side in the first direction X. The switching element TrD1 includes a semiconductor layer SC1. The switching element TrD2 includes a semiconductor layer SC2. The switching element TrD3 includes a semiconductor layer SC3. The semiconductor layers SC1 to S3 each have a substantially U-shape and intersect the scanning line G2 at two positions.

In the switching element TrD1, the semiconductor layer SC1 has a first part E11 on a first end and a second part E12 on a second end. The first part E11 is electrically coupled to the signal line S1 via a contact hole CH11. The second part E12 is electrically coupled to the pixel electrode PE1 (refer to FIG. 5) via a contact hole CH12.

The two parts of the scanning line G2 intersecting the semiconductor layer SC1 serve as gate electrodes WG11 and WG12.

In the switching element TrD2, the semiconductor layer SC2 has a first part E21 on a first end and a second part E22 on a second end. The first part E21 is electrically coupled to the signal line S2 via a contact hole CH21. The second part E22 is electrically coupled to the pixel electrode PE2 (refer to FIG. 5) via a contact hole CH22.

The two parts of the scanning line G2 intersecting the semiconductor layer SC2 serve as gate electrodes WG21 and WG22.

In the switching element TrD3, the semiconductor layer SC3 has a first portion E31 on a first end and a second portion E32 on a second end. The first part E31 is electrically coupled to the signal line S3 via a contact hole CH31. The second part E32 is electrically coupled to the pixel electrode PE3 (refer to FIG. 5) via a contact hole CH32.

The two parts of the scanning line G2 intersecting the semiconductor layer SC3 serve as gate electrodes WG31 and WG32. Of the three semiconductor layers SC1, SC2, and SC3 arranged side by side in the direction in which the scanning line G2 extends, the second part E32 of the semiconductor layer SC3 is on a straight line in which the second part E12 of the semiconductor layer SC1 and the second part E22 of the semiconductor layer SC2 are arranged. In the following description, the semiconductor layers SC1, SC2, and SC3 may be collectively referred to as SC.

Since the contact hole CH22 and the contact hole CH32 have the same configuration as the contact hole CH12, the contact hole CH12 will be described below, and the description of the contact hole CH22 and the contact hole CH32 will be omitted. As illustrated in FIGS. 8 and 9, the contact part PA1 of the pixel electrode PE1 faces a contact electrode RE and is electrically coupled to the contact electrode RE via the contact hole CH12. FIG. 9 illustrates the configuration below the first orientation film AL1 illustrated in FIG. 6.

In FIG. 9, the first insulating film 11 has a silicon nitride base film 111 and a silicon oxide insulating film 112 laminated on the base film 111. The second insulating film 12 is a silicon oxide made of TEOS (tetraethoxysilane).

As illustrated in FIG. 8, the contact hole CH12 includes a contact hole CH121, a contact hole CH122, a contact hole CH123, and a contact hole CH124. The contact hole CH121, the contact hole CH122, the contact hole CH123, and the contact hole CH124 illustrated in FIGS. 8 and 9 represent the size of the bottom surface in a plan view of the XY plane. The contact hole CH121, the contact hole CH122, the contact hole CH123, and the contact hole CH124 can be referred as the first contact hole CH121, the second contact hole CH122, the third contact hole CH123, and the fourth contact hole CH124, respectively.

As illustrated in FIG. 9, a light-shielding body LS is positioned between the first insulating substrate 10 and the first insulating film 11. The semiconductor layer SC1 is positioned between the first insulating film 11 and the second insulating film 12. While the semiconductor layer SC1 is made of polycrystalline silicon, for example, they may be made of amorphous silicon or an oxide semiconductor, for example.

The contact electrode RE includes a first contact conductive layer RE1, a second contact conductive layer RE2, and a third contact conductive layer RE3. The first contact conductive layer RE1 is coupled to the second part E12 of the switching element TrD1 illustrated in FIG. 7. The first contact conductive layer RE1 serves as a drain (or source) of the switching element TrD1. The first contact conductive layer RE1 is formed simultaneously with the signal lines S1, S2, and S3 and made of the same material as that of the signal lines S1, S2, and S3.

The second contact conductive layer RE2 is formed simultaneously with the metal wires TL1, TL2, and TL3 and made of the same material as that of the metal wires TL1, TL2, and TL3. The second contact conductive layer RE2 is electrically coupled to the above of the first contact conductive layer RE1.

The third contact conductive layer RE3 is formed simultaneously with the detection electrode CE and made of the same material as that of the detection electrode CE. The contact part PA1 of the pixel electrode PE1 is electrically coupled to the second contact conductive layer RE2 via the third contact conductive layer RE3.

As illustrated in FIG. 9, the first insulating film 11 is provided on the first insulating substrate 10. The first insulating film 11 covers the light-shielding body LS on the first insulating substrate 10.

The semiconductor layer SC1 is provided on the first insulating film 11. The second insulating film 12 is provided on the semiconductor layer SC1. The gate electrode WG12 is provided on the second insulating film. The third insulating film 13 is provided on the gate electrode WG12 and covers the gate electrode WG12 and the semiconductor layer SC1.

As illustrated in FIG. 6, the signal line S1 is provided on the third insulating film 13. As illustrated in FIG. 7, the signal line S1 is coupled to the first part E11 of the semiconductor layer SC1. The first contact conductive layer RE1 illustrated in FIG. 9 is provided on the third insulating film 13. The first contact conductive layer RE1 is coupled to the second part E12 of the semiconductor layer SC1 via the contact hole CH121 formed in the third insulating film 13.

As illustrated in FIG. 6, the fourth insulating film 14 is provided on the signal line S1. As illustrated in FIG. 9, the second contact conductive layer RE2 is provided on the fourth insulating film 14. The second contact conductive layer RE2 comes into contact with the first contact conductive layer RE1 via the contact hole CH122 formed in the fourth insulating film 14. The area on the bottom surface of the contact hole CH122 illustrated in FIG. 8 is the contact area of the second contact conductive layer RE2 in which the first contact conductive layer RE1 and the second contact conductive layer RE2 are in contact with each other.

As illustrated in FIG. 6, the metal wire TL1 is provided on the fourth insulating film 14. The fifth insulating film 15 covers the fourth insulating film 14 and the metal wire TL1. As illustrated in FIG. 9, the fifth insulating film 15 covers a part of the second contact conductive layer RE2 in the contact region in contact with the first contact conductive layer RE1, and the rest of the second contact conductive layer RE2 is exposed at the contact hole CH123 or contact hole CH124. The rest of the second contact conductive layer RE2 is covered with the third contact conductive layer RE3.

As illustrated in FIG. 9, the third contact conductive layer RE3 is provided over the fifth insulating film 15 and the second contact conductive layer RE2.

The detection electrode CE is provided on the fifth insulating film 15. The sixth insulating film 16 is provided on the detection electrode CE and the third contact conductive layer RE3.

The contact portion PA1 of the pixel electrode PE1 is in contact with the third contact conductive layer RE3 via the contact hole CH124 formed in the sixth insulating film 16. As illustrated in FIG. 8, the contact hole CH124 and the contact hole CH123 are located at overlapping positions in a plan view of the XY plane. With this structure, the second contact conductive layer RE2 and the contact portion PA1 of the pixel electrode PE1 are electrically coupled.

Since the fifth insulating film 15 covers a part of the second contact conductive layer RE2 in the contact region in contact with the first contact conductive layer RE1 near the second direction Y, the contact hole CH123 deviates from the contact hole CH122 toward the second direction Y.

An angle $\psi 1$ is an angle formed by the wall surface of the contact hole CH122 formed in the fourth insulating film 14 with a plane parallel to the XY plane of the first insulating substrate 10. An angle $\psi 2$ is an angle formed by the wall surface of the contact hole CH123 formed in the fifth insulating film with a plane parallel to the plane of the first substrate.

The angle $\psi 2$ is smaller than the angle $\psi 1$. The angle $\psi 2$ is less than 60 degrees. For example, the angle $\psi 2$ is 45 degrees or more and 55 degrees or less.

As illustrated in FIG. 8, the contact electrode RE does not overlap with the scanning line G1 in the plan view of the XY plane. With this structure, the parasitic capacitance between the contact electrode RE and the scanning line G1 can be suppressed.

As illustrated in FIG. 4, the detection electrode CE and the metal wires TL1, TL2, and TL3 are electrically coupled at any one of widened parts TCE1, TCE2, and TCE3, which are parts of the metal wires TL1, TL2, and TL3, respectively. As illustrated in FIG. 5, the widened parts TCE1, TCE2, and TCE3 are disposed at positions not aligning with the contact parts PA1, PA2, and PA3 having the contact holes CH12, CH22, and CH32, respectively. With this structure, the sub-detection electrode CEA that couples the main detection electrodes CEP disposed side by side in the second direction Y is disposed at a position overlapping the metal wire TL2. This configuration can maintain the thickness of the fifth insulating film 15 and reduce the width of the sub-pixel SPix in the first direction X. As a result, the display device PNL according to the first embodiment can have higher resolution.

As illustrated in FIG. 6, the width of main lines ML (refer to FIG. 4) of the metal wires TL1, TL2, and TL3 in the first direction X is smaller than that of the light-shielding layer BM. This structure makes the main lines ML of the metal wires TL1, TL2, and TL3 less likely to be visually recognized.

As illustrated in FIG. 5, the width of the widened parts TCE1, TCE2, and TCE3 is larger than that of the main lines ML of the metal wires TL1, TL2, and TL3 in the first direction X. In FIG. 5, the light-shielding layer BM has a plurality of first parts BM1 extending in the first direction X and a plurality of second parts BM2 extending in the second direction Y. The light-shielding layer BM surrounds the openings AP of the sub-pixels SPix in a planar view of the X-Y plane. With this structure, at least a part of the widened parts TCE1, TCE2, and TCE3 overlaps the second part BM2 and the other part thereof protrudes from the second part BM2 in a planar view of the X-Y plane. In other words, as illustrated in FIG. 5, the width of the widened parts TCE1, TCE2, and TCE3 is larger than that of the second part BM2 of the light shielding layer BM in the first direction X.

As illustrated in FIG. 13, in the display device PNL according to the first embodiment, a pixel having the widened parts TCE1, TCE2, and TCE3 serves as a pixel Pix (first pixel) including the coupling part CT (refer to FIGS. 10 to 12). By contrast, in the display device PNL according to the first embodiment, a pixel not having the widened parts TCE1, TCE2, and TCE3 serves as a pixel Pix (second pixel) not including the coupling part CT. The pixels Pix (first pixels) including the coupling part CT (refer to FIGS. 10 to 12) and the pixels Pix (second pixels) not including the coupling part CT are alternately disposed in the first direction X. The pixels Pix including the coupling part CT and the pixels Pix not including the coupling part CT are alternately disposed in the second direction Y. As described above, non-coupling regions PTN not having the widened parts TCE1, TCE2, and TCE3 are present in every other pixel Pix, thereby reducing the amount of shielded light due to the effects of the widened parts TCE1, TCE2, and TCE3.

As illustrated in FIG. 13, first coupling regions PT1, second coupling regions PT2, third coupling regions PT3, and the non-coupling regions PTN are disposed in 6×6 pixels Pix. In the first coupling regions PT1, the second coupling regions PT2, and the third coupling regions PT3, the pixel Pix has any one of the widened parts TCE1, TCE2, and TCE3 in the sub-pixels SPix.

In the first coupling region PT1, the widened part TCE1 is electrically coupled to the detection electrode CE in the contact hole TH. With this structure, as illustrated in FIG. 10, the widened part TCE1 is coupled to the detection electrode CE as the coupling part CT. In the first coupling region PT1, the widened parts TCE2 and TCE3 are not coupled to the detection electrode CE.

In the second coupling region PT2, the widened part TCE2 is electrically coupled to the detection electrode CE in the contact hole TH. With this structure, as illustrated in FIG. 11, the widened part TCE2 is coupled to the detection electrode CE as the coupling part CT. In the second coupling region PT2, the widened parts TCE1 and TCE3 are not coupled to the detection electrode CE.

In the third coupling region PT3, the widened part TCE3 is electrically coupled to the detection electrode CE in the contact hole TH. With this structure, as illustrated in FIG. 12, the widened part TCE3 is coupled to the detection electrode CE as the coupling part CT. In the third coupling region PT3, the widened parts TCE1 and TCE2 are not coupled to the detection electrode CE.

As illustrated in FIG. 13, the pixel Pix (first pixel) having the widened parts TCE1, TCE2, and TCE3 includes the sub-pixels SPix1, SPix2, and SPix3. Similarly, the pixel Pix (second pixel) not having the widened parts TCE1, TCE2, and TCE3 includes the sub-pixels SPix1, SPix2, and SPix3. Three pixels Pix (first pixels) having the widened parts TCE1, TCE2, and TCE3 are disposed side by side in the second direction Y with the pixels Pix (second pixels) not having the widened parts TCE1, TCE2, and TCE3 sandwiched therebetween. In one of the three pixels Pix (first pixels) having the widened parts TCE1, TCE2, and TCE3, the widened part TCE1 of the sub-pixel SPix1 is coupled to the detection electrode CE in the contact hole TH in the first coupling region PT1.

Similarly, in one of the three pixels Pix (first pixels) having the widened parts TCE1, TCE2, and TCE3, the widened part TCE2 of the sub-pixel SPix2 is coupled to the detection electrode CE in the contact hole TH in the second coupling region PT2. With this structure, as illustrated in FIG. 11, the widened part TCE2 is coupled to the detection electrode CE as the coupling part CT. In one of the three pixels Pix (first pixels) having the widened parts TCE1, TCE2, and TCE3, the widened part TCE3 of the sub-pixel SPix3 is coupled to the detection electrode CE in the contact hole TH.

Three pixels Pix (first pixels) having the widened parts TCE1, TCE2, and TCE3 are disposed side by side in the first direction X with the pixels Pix (second pixels) not having the widened parts TCE1, TCE2, and TCE3 sandwiched therebetween. In one of the three pixels Pix (first pixels) having the widened parts TCE1, TCE2, and TCE3, the widened part TCE1 of the sub-pixel SPix1 is coupled to the detection electrode CE in the contact hole TH in the first coupling region PT1. Similarly, in one of the three pixels Pix (first pixels) having the widened parts TCE1, TCE2, and TCE3, the widened part TCE2 of the sub-pixel SPix2 is coupled to the detection electrode CE in the contact hole TH in the second coupling region PT2. In one of the three pixels Pix (first pixels) having the widened parts TCE1, TCE2, and TCE3, the widened part TCE3 of the sub-pixel SPix3 is coupled to the detection electrode CE in the contact hole TH.

With this configuration, the positions of the contact holes TH are evenly dispersed. Thus, the distortion of the first orientation film AL1 due to the effects of the contact holes TH becomes inconspicuous. As a result, the display quality is less likely to deteriorate.

In each of the first coupling regions PT1, the second coupling regions PT2, and the third coupling regions PT3, the sub-pixels SPix1, SPix2, and SPix3 have the widened parts TCE1, TCE2, and TCE3, respectively. With this configuration, the widened parts TCE1, TCE2, and TCE affect the sub-pixels SPix1, SPix2, and SPix3, respectively, thereby reducing fluctuations in shielding light.

FIG. 10 is the sectional view of the X-X' section in FIG. 13. As illustrated in FIG. 10, the widened part TCE1 and the detection electrode CE are electrically coupled in the contact hole TH. At the coupling part CT, the widened part TCE1 is directly in contact with the detection electrode CE. Alternatively, at the coupling part CT, another conductive layer may be interposed between the widened part TCE1 and the detection electrode CE. The widened part TCE2 and the detection electrode CE are not electrically coupled in the X-X' section in FIG. 13. The widened part TCE3 and the detection electrode CE are not electrically coupled in the X-X' section in FIG. 13.

FIG. 11 is the sectional view of the XI-XI' section in FIG. 13. As illustrated in FIG. 11, the widened part TCE2 and the detection electrode CE are electrically coupled in the contact hole TH. At the coupling part CT, the widened part TCE2 is directly in contact with the detection electrode CE. Alternatively, at the coupling part CT, another conductive layer may be interposed between the widened part TCE2 and the detection electrode CE. The widened part TCE1 and the detection electrode CE are not electrically coupled in the XI-XI' section in FIG. 13. The widened part TCE3 and the detection electrode CE are not electrically coupled in the XI-XI' section in FIG. 13.

FIG. 12 is the sectional view of the XII-XII' section in FIG. 13. As illustrated in FIG. 12, the widened part TCE3 and the detection electrode CE are electrically coupled in the contact hole TH. At the coupling part CT, the widened part TCE3 is directly in contact with the detection electrode CE. Alternatively, at the coupling part CT, another conductive layer may be interposed between the widened part TCE3 and the detection electrode CE. The widened part TCE1 and the detection electrode CE are not electrically coupled in the XII-XII' section in FIG. 13. The widened part TCE2 and the detection electrode CE are not electrically coupled in the XII-XII' section in FIG. 13.

As illustrated in FIG. 13, in each of the first coupling region PT1, the second coupling region PT2, and the third coupling region PT3, one of the widened parts TCE1, TCE2, and TCE3 is coupled to the detection electrode CE, and the other two of them are not coupled to the detection electrode CE. One first coupling region PT1, one second coupling region PT2, and one third coupling region PT3 are disposed in the first direction X in the 6×6 pixels Pix. One first coupling region PT1, one second coupling region PT2, and one third coupling region PT3 are disposed in the second direction Y in the 6×6 pixels Pix.

FIG. 7 of Japanese Patent Application Laid-open Publication No. 2017-146449 describes a sectional view illustrating a phenomenon in which an orientation film is not formed in a contact hole. As illustrated in FIG. 7 of Japanese Patent Application Laid-open Publication No. 2017-146449, it is considered that when a liquid orientation film material is applied in a state where there are bubbles at the bottom of the contact hole, the bubbles divide the orientation film material. The orientation film material in the contact hole may overlap the orientation film material around the contact hole, causing film thickness unevenness of the orientation film material. If the film thickness unevenness of the orientation film material exceeds the range that can be shielded by the light-shielding layer BM and is affected, the display unevenness of the display device PNL may occur.

Therefore, the display device PNL according to the first embodiment includes the array substrate SUB1, the counter substrate SUB2 provided with the color filters, and the liquid crystal layer LC between the array substrate SUB1 and the counter substrate SUB2. On one surface of the array substrate SUB1, the scanning lines GL arranged side by side in the second direction Y with a gap interposed therebetween, the signal lines SL arranged side by side in the first direction X with a gap interposed therebetween, the fourth insulating film 14 serving as the first organic insulating film and provided on the signal lines SL, and the fifth insulating film 15 serving as the second organic insulating film and provided on the fourth insulating film 14 are provided. In each region surrounded by the corresponding scanning lines GL and the corresponding signal line SL, the semiconductor layer SC, the first contact conductive layer RE1, the second contact conductive layer RE2, and the pixel electrode PE as the first electrode are provided. The signal line SL is electrically coupled to the first part of the semiconductor layer SC, and the first contact conductive layer RE1 is electrically coupled to the second part of the semiconductor layer SC. The second contact conductive layer RE2 comes into contact with the first contact conductive layer RE1 via the second contact hole CH122 formed in the fourth insulating film 14. At least a part of the contact region of the second contact conductive layer RE2 in which the second contact conductive layer RE2 is in contact with the first contact conductive layer RE1 is covered with the fifth insulating film 15. The pixel electrode PE and the second contact conductive layer RE2 are electrically coupled to each other via the third contact hole CH123 formed in the fifth insulating film 15. The second contact hole CH122 and the third contact hole CH123 deviate from each other in the second direction Y.

This structure reduces the space volume of the third contact hole CH123 formed in the fifth insulating film 15. Even if the orientation film material to be the first orientation film AL1 is applied to the bottom of the third contact hole CH123 and bubbles are generated, the amount of the orientation film material discharged to the outer periphery of the contact hole CH123 due to the bubbles is small. Thus, the film thickness unevenness of the first orientation film AL1 becomes small around the contact hole CH123. Therefore, since the film thickness unevenness of the orientation film material exceeds the range that can be shielded by the light-shielding layer BM but is less likely affected, the display unevenness of the display device PNL may be suppressed.

The angle ψ2 is smaller than the angle ψ1. With this structure, the contact angle with the orientation film material to be the first orientation film AL1 becomes small, so that the orientation film material can be easily filled in the contact hole CH123. Bubbles are less likely to be generated. As a result, the display unevenness of the display device PNL is suppressed.

The display device PNL according to the first embodiment includes the detection electrode CE as the second electrode provided on the fifth insulating film 15 and the sixth insulating film 16 serving an inorganic insulating film provided on the detection electrode CE and the metal wire TL. The pixel electrode PE is provided on the sixth insulating film 16. The metal wire TL is electrically coupled to the detection electrode CE via the contact hole TH and is provided on the fourth insulating film 14. The metal wire TL is covered with the fifth insulating film 15. As illustrated in FIG. 2, the metal wire TL is superimposed on both the electrically coupled detection electrode CE and the electrically uncoupled detection electrode CE in a plan view of the XY plane. The fifth insulating film 15 is an organic insulating film, and thus can be formed thick. Therefore, as illustrated in FIG. 2, the signal transmitted through the metal wire TL is unlikely to affect the uncoupled detection electrode CE.

The metal wire TL overlaps with the signal line SL. The fourth insulating film 14 is an organic insulating film, and thus can be formed thick. Therefore, as illustrated in FIG. 6, the signal transmitted through the metal wire TL does not easily affect the signal line SL. The signal transmitted through the signal line SL does not easily affect the metal wire TL.

Because the metal wire TL overlaps the signal line SL, the width of the metal wire TL in the first direction X is larger than that of the signal line SL. This structure facilitates alignment in deposition and can reduce the resistance of the metal wire TL. The width of the main line ML of the metal wire TL in the first direction X is preferably smaller than that of the light-shielding layer BM overlapping the metal wire TL. This structure makes the metal wire TL less likely to be visually recognized.

The metal wire TL has, at a part thereof, any one of the widened parts TCE1 to TCE3 having the width in the first direction X larger than that of the main line. With the widened parts TCE1, TCE2, and TCE3 having a sufficiently large width, a contact area between any one of the widened parts TCE1, TCE2, and TCE3 and the detection electrode CE can be secured by forming the contact hole TH even if the thickness of the fifth insulating film 15 increases. As described above, the fifth insulating film 15 has the contact holes TH. The contact holes TH each have the coupling part CT at which the detection electrode CE and any one of the widened parts TCE1, TCE2, and TCE3 are coupled. This configuration can secure the distance between the metal wires TL1, TL2, and TL3 and the detection electrode CE in the third direction Z, thereby reducing parasitic capacitance generated between the detection electrode CE and the metal wires TL1, TL2, and TL3 passing over the detection electrode CE. With the widened part TCE1 having a sufficiently large width, the fifth insulating film 15 can be made of a resin material hard to deposit with a smaller width.

The detection electrode CE is disposed on the upper side than the metal wire TL with the fifth insulating film 15 interposed therebetween in the third direction Z. The fifth insulating film 15 has the contact holes TH in which the detection electrode CE and any one of the widened parts TCE1, TCE2, and TCE3 are coupled. The widened parts TCE1, TCE2, and TCE3 are disposed above and overlap the signal lines SL. With this configuration, distortion of the first orientation film AL1 due to the effects of the contact holes TH is less likely to affect the pixel electrodes PE1, PE2, and PE3. As a result, the display quality is less likely to deteriorate.

Figure 14:
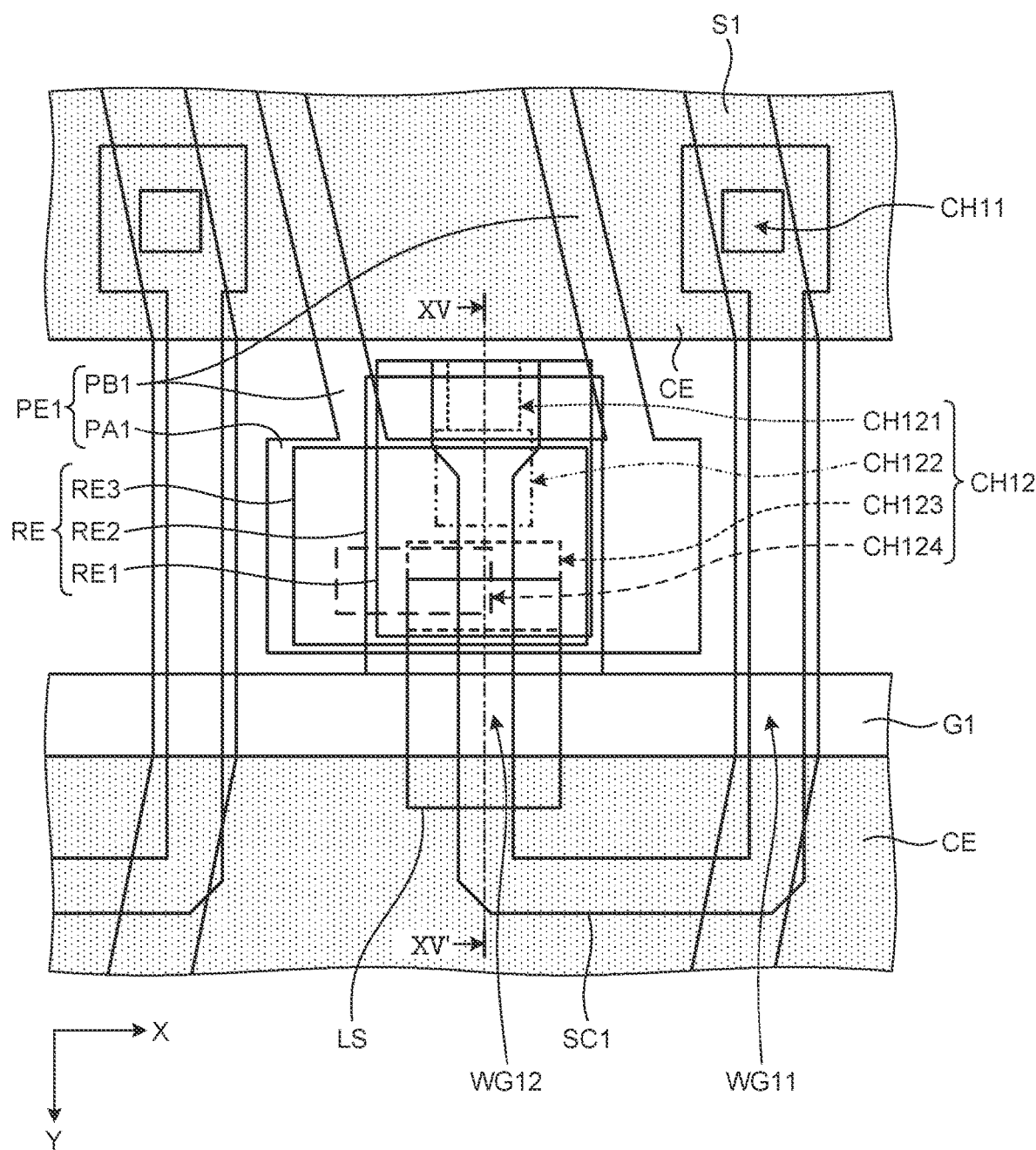
FIG. 14 is a plan view for explaining contact holes according to a second embodiment.

As illustrated in FIG. 14, the contact holes TH are formed between one detection electrode CE and one metal wire TL1, for example. This configuration can reduce coupling resistance, thereby suppressing waveform deterioration in the drive signals supplied to the detection electrode CE. As a result, the display device PNL can detect the capacitance with higher accuracy.

As illustrated in FIG. 5, the widened parts TCE1, TCE2, and TCE3 are disposed between two scanning lines G1 and G2 disposed side by side. In a planar view of the X-Y plane, none of the widened parts TCE1, TCE2, and TCE3 overlaps the first part BM1. With this configuration, the positions of the widened parts TCE1, TCE2, and TCE3 are different from those of the contact parts PA1, PA2, and PA3 of the pixel electrodes PE1, PE2, and PE3, respectively, illustrated in FIG. 5. As a result, as illustrated in FIG. 14, the contact holes TH can be formed more precisely, thereby increasing the reliability of electrically coupling between the detection electrode CE and the metal wire TL.

Second Embodiment

Figure 15:
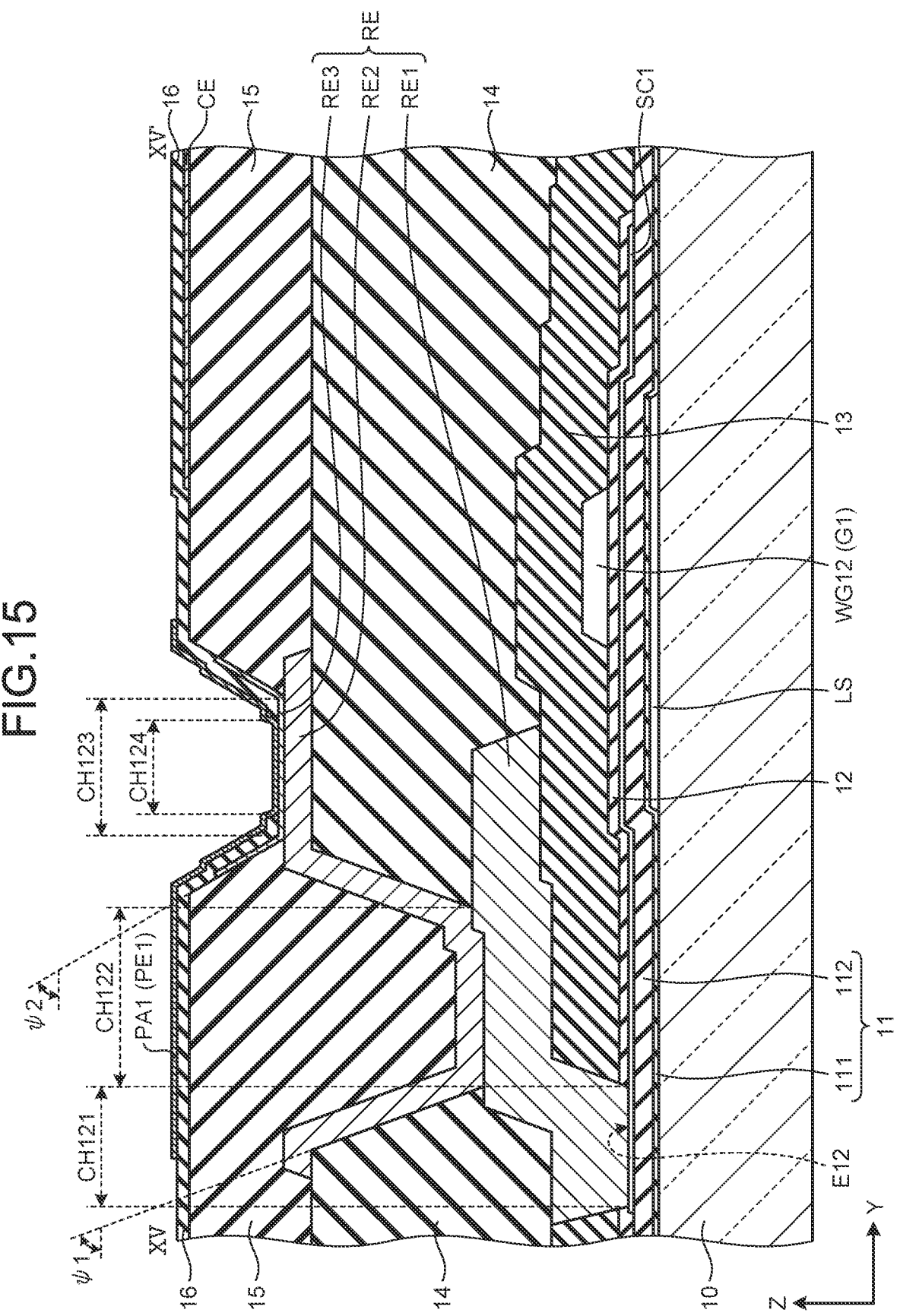
FIG. 15 is a partial sectional view for explaining the XV-XV' section in FIG. 14.
Figure 17:
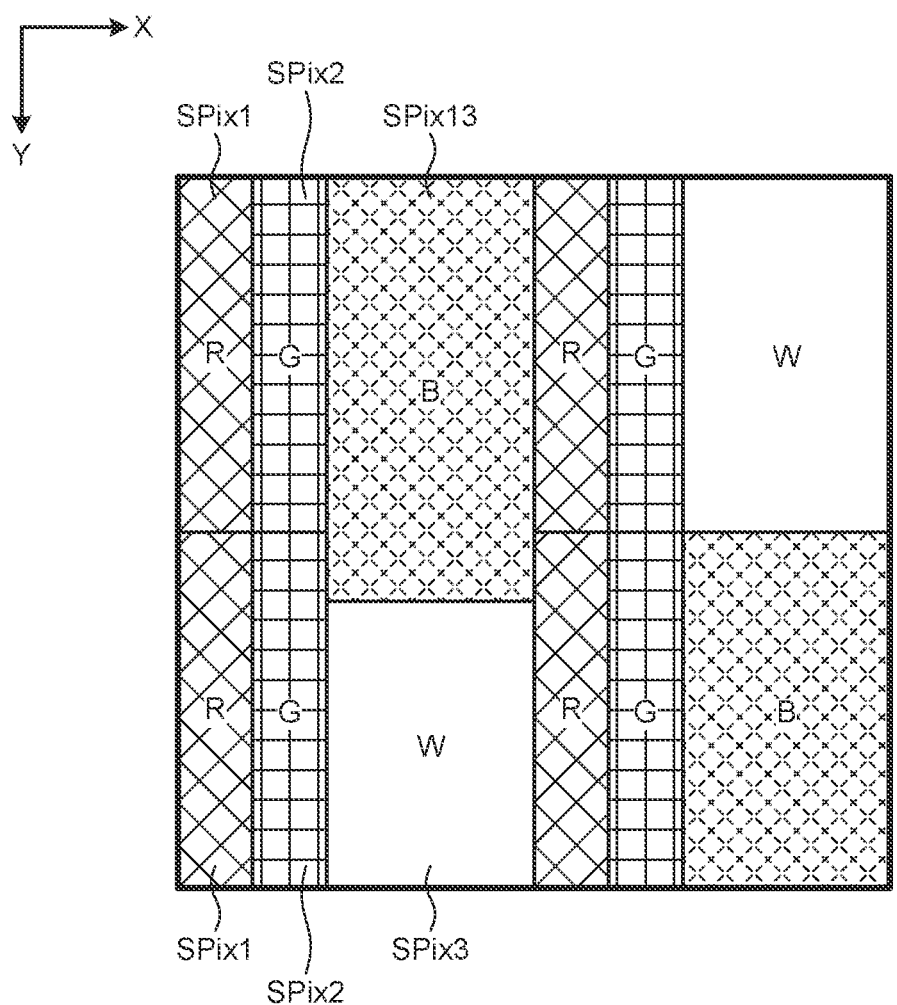
FIG. 17 is a schematic diagram for explaining sub-pixels according to the third embodiment.

FIG. 14 is a plan view for explaining contact holes according to the second embodiment. FIG. 15 is a partial sectional view for explaining the XV-XV' section in FIG. 14. FIG. 17 is a schematic diagram for explaining the sub-pixels according to the second embodiment. Components described in the first embodiment are denoted by like reference numerals, and the explanation thereof is omitted. As illustrated in FIGS. 14 and 15, the second embodiment is different from the first embodiment in the configuration of the contact hole CH123 and the contact hole CH124.

As illustrated in FIG. 15, the contact hole CH123 and the contact hole CH124 cover the entire second contact conductive layer RE2 in the contact region in contact with the first contact conductive layer. The second contact conductive layer RE2 on the fourth insulating film 14 is exposed in the contact hole CH123 or the contact hole CH124.

The contact hole CH123 formed in the fifth insulating film 15 exposes the second contact conductive layer RE2 the bottom of which is above the fourth insulating film 14. The third contact conductive layer RE3 is provided over the fifth insulating film 15 and the second contact conductive layer RE2.

The detection electrode CE is provided on the fifth insulating film 15. The sixth insulating film 16 is provided on the detection electrode CE and the third contact conductive layer RE3.

The contact portion PA1 of the pixel electrode PE1 is in contact with the third contact conductive layer RE3 via the contact hole CH124 formed in the sixth insulating film 16.

The contact hole CH124 and the contact hole CH123 are located at overlapping positions in the plan view of the XY plane. With this structure, the second contact conductive layer RE2 and the contact portion PA1 of the pixel electrode PE1 are electrically coupled.

Since the fifth insulating film 15 covers the entire second contact conductive layer RE2 in the contact region in contact with the first contact conductive layer RE1, the contact hole CH123 deviates from the contact hole CH122 toward the second direction Y.

The angle $\psi 2$ is smaller than the angle $\psi 1$. The angle $\psi 2$ is less than 60 degrees. For example, the angle $\psi 2$ is 45 degrees or more and 55 degrees or less.

As described above, the entire second contact conductive layer RE2 in the contact region in contact with the first contact conductive layer is covered with the fifth insulating film 15. The second contact hole CH122 and the third contact hole CH123 do not overlap in the plan view of the XY plane. This structure reduces the space volume of the third contact hole CH123 formed in the fifth insulating film 15. Even if the orientation film material to be the first orientation film AL1 is applied to the bottom of the third contact hole CH123 and bubbles are generated, the amount of the orientation film material discharged to the outer periphery of the contact hole CH123 due to the bubbles is small. Thus, the film thickness unevenness of the first orientation film AL1 becomes small around the contact hole CH123. Therefore, since the film thickness unevenness of the orientation film material exceeds the range that can be shielded by the light-shielding layer BM but is less likely affected, the display unevenness of the display device PNL may be suppressed.

Third Embodiment

Figure 16:
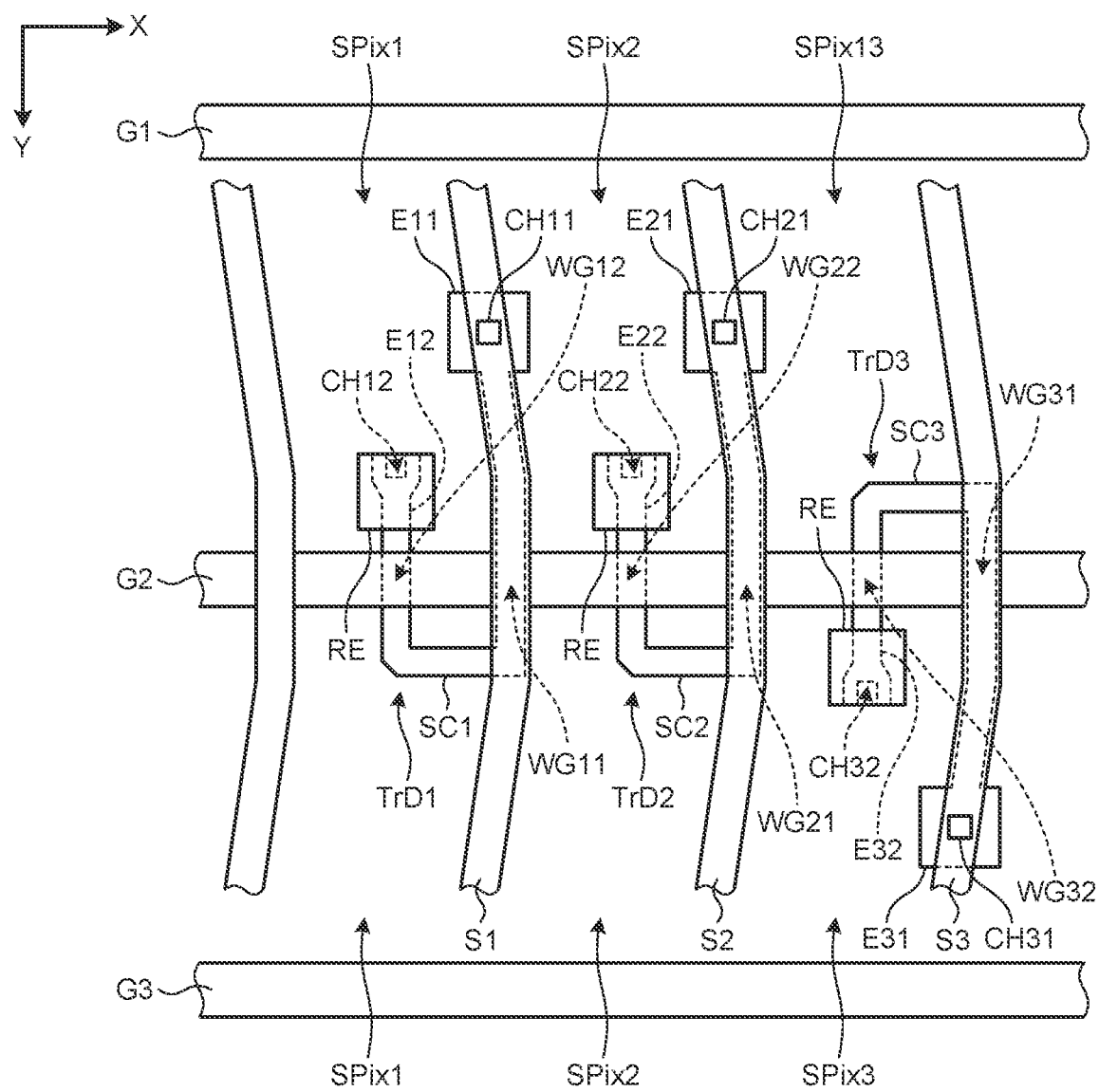
FIG. 16 is a plan view for explaining the switching elements according to a third embodiment.

FIG. 16 is a plan view for explaining the switching elements according to a third embodiment. FIG. 17 is a schematic diagram for explaining the sub-pixels according to the third embodiment. Components described in the first embodiment are denoted by like reference numerals, and the explanation thereof is omitted. The third embodiment is different from the first embodiment in the configuration of a sub-pixel SPix13.

In the switching element TrD3 according to the third embodiment, the semiconductor layer SC3 has the first part E31 on the first end and the second part E32 on the second end. The first part E31 is electrically coupled to the signal line S3 via a contact hole CH31. The second end E32 is electrically coupled to the contact electrode RE via the contact hole CH32. The contact electrode RE is positioned between the signal line S2 and the signal line S3. The contact electrode RE of the switching element TrD3, the first part E31, and the second part E32 are positioned on the side closer to the scanning line G3 with respect to the scanning line G2.

The two parts of the scanning line G2 intersecting the semiconductor layer SC3 serve as the gate electrodes WG31 and WG32. The light-shielding body LS is positioned under the part of the semiconductor layer SC3 intersecting the gate electrode WG32. The second part E32 is shifted to the opposite side of the scanning line G2 with respect to the position where the second part E12 and the second part E33 are disposed side by side.

The two parts of the scanning line G2 intersecting the semiconductor layer SC3 serve as gate electrodes WG31 and WG32. Of the three semiconductor layers SC1, SC2, and SC3 arranged side by side in the direction in which the scanning line G2 extends, the second part E32 of the semiconductor layer SC3 is at a position deviated from the straight line in which the second part E12 of the semiconductor layer SC1 and the second part E22 of the semiconductor layer SC2 are arranged. With this structure, the area of the sub-pixel SPix13 can be increased.

The contact holes CH12 and CH22 are formed side by side on a single line extending along the first direction X. By contrast, the contact hole CH32 is positioned in an oblique direction intersecting the first direction X with respect to the contact holes CH12 and CH22. In other words, the contact hole CH32 is formed at a position deviated from the single line on which the contact holes CH12 and CH22 are formed side by side.

The widened parts TCE1, TCE2, and TCE3 are disposed above and overlap any one of the contact holes CH11, CH21, and CH31 illustrated in FIG. 16. As a result, the contact holes TH can be formed more precisely, thereby increasing the reliability of electrical coupling between the detection electrode CE and the metal wire TL.

As illustrated in FIG. 17, the sub-pixels SPix1 are arrayed along the second direction Y in the first column. The sub-pixels SPix2 are arrayed along the second direction Y in the second column next to the first column. The sub-pixel SPix3 and the sub-pixel SPix13 are alternately arrayed along the second direction Y in the third column next to the second column. The first column, the second column, and the third column are cyclically arrayed in the first direction X. The sub-pixels SPix1 are provided with the color filter of red (R). The sub-pixels SPix2 are provided with the color filter of green (G). The sub-pixels SPix3 are provided with the color filter of white or transparent (W). The sub-pixels SPix13 are provided with the color filter of blue (B).

Because the sub-pixels SPix13 increase the luminance, the current value of the backlight unit IL can be reduced, thereby reducing power consumption. This configuration can secure the area of blue (B) having lower visibility.

While exemplary embodiments have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the disclosure.

The widened parts TCE1, TCE2, and TCE3, for example, may be referred to as any one of relay electrodes, coupling parts, wide parts, expanded parts, widened parts, and base parts or simply referred to as first parts of the metal wire TL, for example. The coupling part CT may be referred to as a contact part.

The metal wire TL may be an auxiliary wire that does not supply the drive signal to the detection electrode CE, and the detection electrode CE may be a solid film electrode.

While the plane defined by the first direction X and the second direction Y is parallel to the surface of the array substrate SUB1, the surface of the array substrate SUB1 may be curved. In this case, viewed in a direction in which the display device PNL has the largest area, a certain direction is a first direction, and a direction intersecting the first direction is a second direction. The direction in which the display device PNL has the largest area is defined as a third direction orthogonal to the first direction and the second direction.

What is claimed is:

1. A display device comprising:
   a scanning line;
   a semiconductor layer;
   a pixel electrode;
   a first insulating film having a first contact hole;
   an organic insulating film having a second contact hole;
   a second insulating film having a third contact hole; and
   a third insulating film provided between the pixel electrode and the second insulating film,
   wherein
   the semiconductor layer has a first linear portion that is orthogonal to the scanning line,
   the pixel electrode is electrically connected to the first linear portion via the first contact hole, the second contact hole, and the third contact hole,
   the first linear portion overlaps the first contact hole, the second contact hole, and the third contact hole that are aligned along the first linear portion,
   a center of the second contact hole is located between a center of the first contact hole and a center of the third contact hole,
   the organic insulating film is provided between the first insulating film and the second insulating film,
   the second insulating film is provided between the pixel electrode and the organic insulating film,
   the first contact hole exposes the first linear portion,
   the third insulating film has a fourth contact hole,
   the pixel electrode is electrically connected to the first linear portion via the first contact hole, the second contact hole, the third contact hole, and the fourth contact holes,
   a center of the fourth contact hole is shifted from the center of the third contact hole relative to an extending direction of the first linear portion, and
   the fourth contact hole has an overlapping portion that overlaps the third contact hole and a portion that does not overlap the third contact hole.

2. The display device of claim 1, wherein, in a plan view,
   a size of the second contact hole is larger than a size of the first contact hole, and
   a size of the third contact hole is larger than the size of the second contact hole.

3. The display device of claim 1, wherein
   the second contact hole has an overlapping portion that overlaps the third contact hole and a portion that does not overlap the third contact hole, and
   the third contact hole has the overlapping portion that overlaps the second contact hole and a portion that does not overlap the second contact hole.

4. The display device of claim 1, wherein
   the pixel electrode has a contact part and a pair of electrode parts,
   the first contact hole is located between the pair of the electrode parts, outside the contact part.

5. The display device of claim 1, further comprising an insulating substrate and light-shielding body, wherein
   the light-shielding body is provided between the scanning line and the insulating substrate,
   the light-shielding body is located overlapping a region where the first linear portion and the scanning line cross at right angles, and
   part of the third contact hole overlaps the light-shielding body, and
   the second contact hole does not overlap the light-shielding body.

6. The display device of claim 1, wherein part of the second contact hole overlaps the overlapping portion that the third contact hole and the fourth contact hole overlap.

7. The display device of claim 1, further comprises a detection electrode, wherein
   the detection electrode is opposed to the pixel electrode,
   the detection electrode is provided between the pixel electrode and the second insulating film,
   the detection electrode overlaps none of the first contact hole, the second contact hole, and the third contact hole, and
   the third contact hole is located closer to the scanning line than the first contact hole is.

8. The display device of claim 1, further comprises a common electrode, wherein
 the detection electrode is opposed to the pixel electrode,
 the detection electrode is provided between the pixel electrode and the third insulating film,
 the detection electrode overlaps none of the first contact hole, the second contact hole, the third contact hole, and the fourth contact hole.

* * * * *